United States Patent
Togari et al.

(10) Patent No.: US 12,052,171 B2
(45) Date of Patent: Jul. 30, 2024

(54) COMMUNICATION SYSTEM AND COMMUNICATION METHOD

(71) Applicant: NIPPON TELEGRAPH AND TELEPHONE CORPORATION, Tokyo (JP)

(72) Inventors: Yukihiro Togari, Musashino (JP); Hisashi Kojima, Musashino (JP); Takeshi Kuwahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 391 days.

(21) Appl. No.: 17/602,390

(22) PCT Filed: Mar. 27, 2020

(86) PCT No.: PCT/JP2020/014001
§ 371 (c)(1),
(2) Date: Oct. 8, 2021

(87) PCT Pub. No.: WO2020/209099
PCT Pub. Date: Oct. 15, 2020

(65) Prior Publication Data
US 2022/0166715 A1    May 26, 2022

(30) Foreign Application Priority Data
Apr. 9, 2019 (JP) ................ 2019-074382

(51) Int. Cl.
*H04L 45/74* (2022.01)
*H04L 45/00* (2022.01)

(52) U.S. Cl.
CPC .......... *H04L 45/74* (2013.01); *H04L 45/34* (2013.01)

(58) Field of Classification Search
CPC ....... H04L 45/74; H04L 45/34; H04L 12/717; H04L 12/727; H04L 12/749
See application file for complete search history.

(56) References Cited

U.S. PATENT DOCUMENTS

2014/0369356 A1* 12/2014 Bryant .............. H04L 45/50 370/392
2018/0219783 A1* 8/2018 Pfister .............. H04L 67/1027
2018/0375684 A1* 12/2018 Filsfils ............. H04L 45/24
(Continued)

OTHER PUBLICATIONS

"RFC 8754 IPv6 Segment Routing Header (SRH)"; Filsfils et al.; Internet Engineering Task Force (IETF); Mar. 2020 (Year: 2020).*
(Continued)

*Primary Examiner* — Benjamin H Elliott, IV
(74) *Attorney, Agent, or Firm* — IPUSA, PLLC

(57) ABSTRACT

A communication system realizes End-to-End communication between communication devices via at least one service function by using Segment Routing IPv6. The communication system executes: transferring a packet received from one of the communication devices at a communication origin of the End-to-End communication, by using an abstracted ID obtained by abstracting a segment ID in a prescribed range determined in advance; and converting, upon receipt of the packet including the abstracted ID, the abstracted ID into an address or a segment ID of a service function instance providing the service function.

7 Claims, 31 Drawing Sheets

(56) References Cited

U.S. PATENT DOCUMENTS

| | | | | |
|---|---|---|---|---|
| 2018/0375766 A1* | 12/2018 | Filsfils | ................ | H04L 12/4633 |
| 2018/0375968 A1* | 12/2018 | Bashandy | ............... | H04L 45/14 |
| 2019/0140863 A1* | 5/2019 | Nainar | .................... | H04L 45/34 |
| 2019/0288949 A1* | 9/2019 | Pfister | .................. | H04L 47/125 |
| 2020/0099610 A1* | 3/2020 | Heron | .................... | H04L 45/22 |
| 2020/0358698 A1* | 11/2020 | Song | ....................... | H04L 45/50 |
| 2021/0377173 A1* | 12/2021 | Zhang | .................... | H04L 45/64 |
| 2022/0038364 A1* | 2/2022 | Du | .......................... | H04L 45/34 |
| 2022/0166715 A1* | 5/2022 | Togari | .................... | H04L 45/74 |

OTHER PUBLICATIONS

"RFC 8986 Segment Routing over IPv6 (SRv6) Network Programming"; Filsfils et al.; Internet Engineering Task Force (IETF); Feb. 2021 (Year: 2021).*

C. Filsfils et al., "SRv6 Network Programming, draft-filsfils-spring-srv6-network-programming-07," SPRING Internet-Draft, Feb. 14, 2019.

* cited by examiner

Fig. 9

| ID | SA | DA | POST-CONVERSION DA |
|---|---|---|---|
| 1 | aa00::/64 | ff00::1 (ABSTRACTED SID OF SERVICE 1) | ADDRESS OF CONTAINER 1 |
| 2 | bb00::/64 | ff00::1 (ABSTRACTED SID OF SERVICE 1) | ADDRESS OF CONTAINER 2 |
| 3 | bc00::/64 | ff00::2 (ABSTRACTED SID OF SERVICE 2) | ADDRESS OF CONTAINER 3 |
| 4 | cc00::/64 | ff00::2 (ABSTRACTED SID OF SERVICE 2) | ADDRESS OF CONTAINER 3 |
| ⋮ | ⋮ | ⋮ | ⋮ |

Fig. 14

| SID | SID ATTRIBUTE | STATE INFORMATION |
|---|---|---|
| aaaa::bc | Global. NODE SID OF ROUTER A | CONNECTION DESTINATION ROUTERS B AND C |
| aaaa::ac | Global. NODE SID OF ROUTER B | CONNECTION DESTINATION ROUTERS A AND C |
| aacd::1 | Local. Adj SID | BETWEEN ROUTERS C AND D |
| aace::1 | Local. Adj SID | BETWEEN ROUTERS C AND E |

Fig. 15

| Prefix | Router -ID/ Originator | INFORMATION IN LAST TRANSMISSION | DIFFERENCE FROM LAST TRANSMISSION |
|---|---|---|---|
| aaaa::/32 | aaab::1 | — | YES |
| bbbb::/48 | bbbc::1 | bbbb::/48 | NO |

| ID | CONNECTION DESTINATION AS | SID (OF GW) | ... | 313 |
|---|---|---|---|---|
| 1 | AS 2501 | ee00::1 | ... | |
| 2 | AS 7503 | ee00::2 | ... | |
| 3 | AS 40001 | ee00::3 | ... | |
| 4 | AS 50001 | ee00::4 | ... | |
| ⋮ | ⋮ | ⋮ | ⋮ | |

Fig. 17

| ITEM | SETTING VALUE |
|---|---|
| DATA TRANSMISSION INTERVAL | 30 SECONDS |
| TRANSMISSION DATA RANGE | ... |
| ⋮ | ⋮ |

| SA OF USER | SFC[0] | SFC[1] | ... |
|---|---|---|---|
| 2008::/64 | IPS SERVICE FROM COMPANY A | — | ... |
| aa00::/64 | IPS SERVICE FROM COMPANY B | FW | ... |
| 2b2b::/64 | PROTOCOL CONVERSION | TRANSCODING | ... |
| ⋮ | ⋮ | ⋮ | ⋮ |

Fig. 20

| ID | SERVICE | ABSTRACTED SID |
|---|---|---|
| 1 | IPS SERVICE FROM COMPANY A | ff00::1 |
| 2 | IPS SERVICE FROM COMPANY B | ff00::2 |
| 3 | PROTOCOL CONVERSION | ff00::3 |
| 4 | ... | ... |

Fig. 21

| DC IDENTIFIER | SERVICE NAME | EXCESS RESOURCE AMOUNT |
|---|---|---|
| 1 | IPS SERVICE FROM COMPANY A | 20Gbps |
| 2 | IPS SERVICE FROM COMPANY B | 5Gbps |
| 3 | PROTOCOL CONVERSION | — |
| ⋮ | ⋮ | ⋮ |

| POLICY | USER | SERVICE REQUEST |
|--------|------|-----------------|
| POLICY 1 | A | IN CASE OF LINK FAILURE, SECOND CLOSEST DATA CENTER WILL PROCESS |
| POLICY 2 | B | BYPASS AS 1 AND TRANSFER WHILE SUPPRESSING DELAY IN END-TO-END TO BE LESS THAN 100 msec |
| ⋮ | ⋮ | ⋮ |

| POLICY NAME | DISTRIBUTION DESTINATION | APPLICABLE CONDITION | Fuction | SID-List |
|---|---|---|---|---|
| POLICY 1 | ROUTER A | SA = aa00::/64 | End.B6.Encaps | ⟨ff00::1, ff00::2⟩ |
| POLICY 2 | ROUTER B | SA = bb00::/64, Dst port = 80 | T.insert | ⟨ff00::1⟩ |
| ⋮ | ⋮ | ⋮ | ⋮ | ⋮ |

COMMUNICATION SYSTEM AND COMMUNICATION METHOD

TECHNICAL FIELD

The present invention relates to a communication system and a communication method.

BACKGROUND ART

A technique has conventionally been known (e.g., Non-Patent Literature 1) by which End-to-End (E2E) communication via a specific service function (SF) in a cloud is realized by using Segment Routing IPv6 (SRv6). When this conventional technique is used, for example, for realizing E2E communication between a terminal used by an end user and a server providing a cloud service as a public cloud on the Internet, via a specific SF in a data center or a cloud (a private cloud), it is necessary to set an E2E path in an edge router in a carrier network, by performing S11 and S12 shown in FIG. 1.

(S11): A cloud orchestrator managed by a service provider transmits cluster NW information including information about an SF instance (e.g., a container or a Virtual Machine [VM] instance that realizes a certain specific service) or the like, to a controller managed by a carrier provider. In this situation, the cluster NW information includes an identifier (e.g., an address or a Segment ID [SID]) of the SF instance and information about a gateway (GW) of a cluster NW.

(S12): The controller managed by the carrier provider calculates a path of the E2E communication between the terminal and the server, on the basis of the cluster NW information including SF instance information (e.g., the identifier of the SF instance) or the like.

(S13): Further, the controller managed by the carrier provider sets a path (routing) for each end user into the edge router in the carrier network.

CITATION LIST

Non-Patent Literature

Non Patent Literature 1: Filsfils, C. et.al., SRv6 Network Programming, draft-filsfils-spring-srv6-network-programming-07

SUMMARY OF THE INVENTION

Technical Problem

According to the conventional technique described above, however, it is necessary for the service provider to notify the carrier provider of the SF instance information or the like, every time a change occurs in the environment or the configuration (e.g., the address designs of SF instances or the number of SF instances) of the cluster NW, for example. Further, identifiers (addresses/SIDs) of the SF instances will be changed or increased/decreased, for example, due to a failure of a physical host, an upgrade of software, or an increase or a merge of SF instance replicas to accommodate a rise in the demand for services. Every time any one of these changes occurs, the carrier provider needs to update or re-set the path in the edge router.

In view of the circumstances described above, it is an object of the present invention to realize End-to-End communication capable of being compliant with changes in service function identifier.

Means for Solving the Problem

To achieve the object described above, an embodiment of the present invention provides a communication system that realizes End-to-End communication between communication devices via at least one service function by using Segment Routing IPv6, the communication system including: transfer means for transferring a packet received from one of the communication devices at a communication origin of the End-to-End communication, by using an abstracted ID obtained by abstracting a segment ID in a prescribed range determined in advance; and conversion means for converting, upon receipt of the packet including the abstracted ID, the abstracted ID into an address or a segment ID of a service function instance providing the service function.

Effects of the Invention

It is possible to realize the End-to-End communication capable of being compliant with changes in the service function identifiers.

BRIEF DESCRIPTION OF DRAWINGS

FIG. 9 is a drawing for explaining an example of a conversion table.

FIG. 14 is a drawing for explaining an example of a link state information table.

FIG. 15 is a drawing for explaining an example of a path information table.

FIG. 16 is a drawing for explaining an example of a DC information table.

FIG. 17 is a drawing for explaining an example of a transmission information table.

FIG. 19 is a drawing for explaining an example of an SFC information table.

FIG. 20 is a drawing for explaining an example of an abstracted SID information table.

FIG. 21 is a drawing for explaining an example of a resource information table.

FIG. 22 is a drawing for explaining an example of a service request information table.

FIG. 25 is a drawing for explaining an example of a policy information management table.

DESCRIPTION OF EMBODIMENTS

The following will describe embodiments of the present invention ("present embodiments") in detail, with reference to the drawings. In the present embodiments, on the premise that routing is established by using SRv6, a communication system 1 will be explained that is, by using an SID obtained by abstracting the identifier (hereinafter, "abstracted SID") of each of the SF instances, capable of being compliant with changes in the identifier (an addresses/SID) of each of the SF instances, i.e., the changes in the identifiers of the individual SF instances impose no impact on path settings in an edge router in a carrier network. In SRv6, because an address (an IPv6 address) is often used as an SID, the address and the SID are the same as each other in many situations.

<Assignment ranges of the abstracted SID>

As explained above, in the present embodiment, the abstracted SID obtained by abstracting the identifier of each of the SF instances is used. The abstracted SID is a unique (in one-to-one correspondence) and static identifier and is assigned to each set of SF instances.

Figure 2:
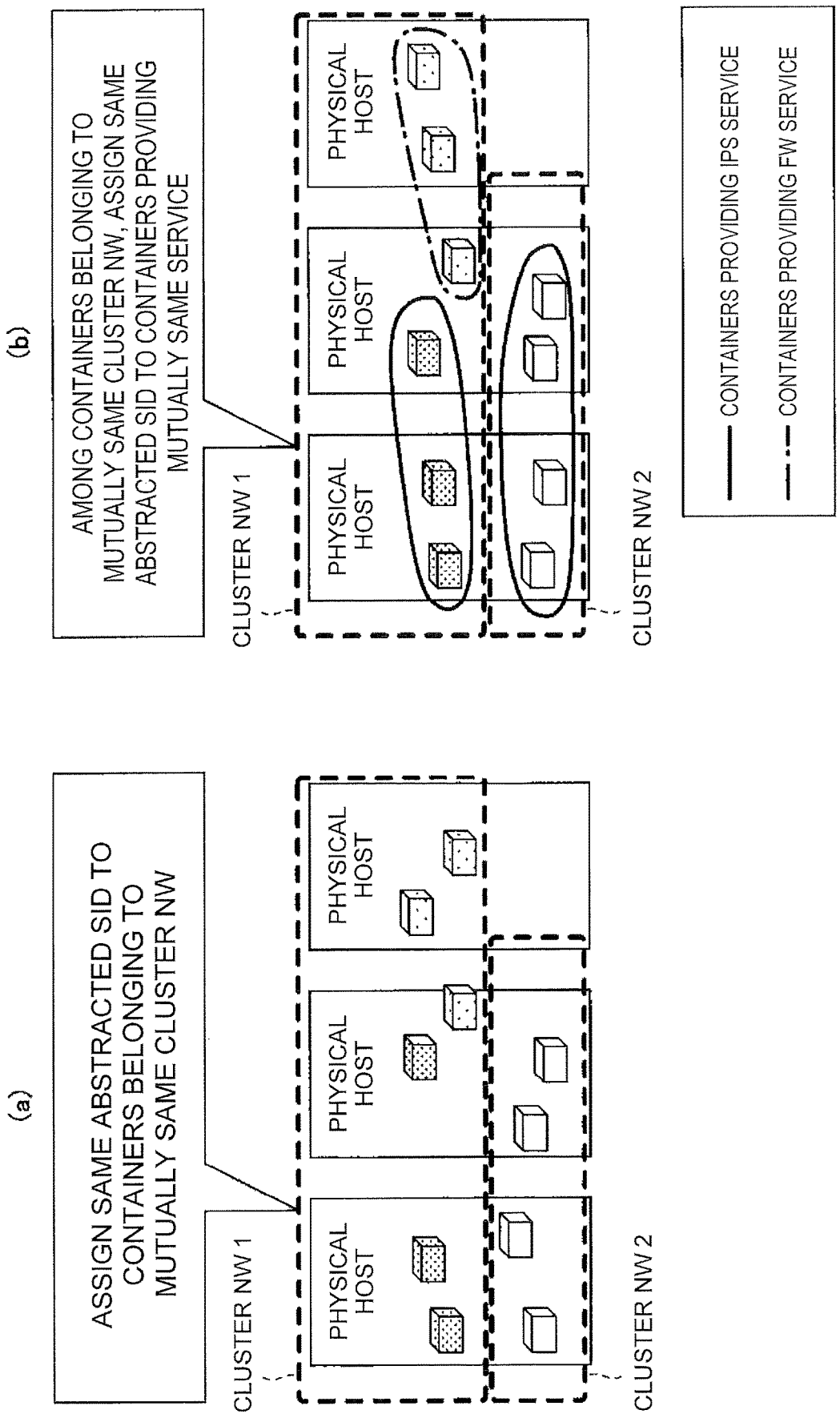
FIG. 2 is a diagram for explaining examples of assignment ranges of abstracted SIDs.

For example, as shown in FIG. 2(a), it is possible to assign the same abstracted SID to containers (an example of the SF instances) belonging to mutually the same cluster NW. FIG. 2(a) shows an example in which one abstracted SID in common is assigned to the six containers belonging to cluster NW 1, whereas another abstracted SID in common is assigned to the four containers belonging to cluster NW 2.

Further, in another example, as shown in FIG. 2(b), among the contains belonging to mutually the same cluster NW, it is possible to assign the same abstracted SID to containers providing mutually the same service. FIG. 2(b) illustrates an example in which, among the containers belonging to cluster NW 1, one abstracted SID in common is assigned to the three containers providing an Intrusion Prevention System or Intrusion Protection System (IPS) service, while another abstracted SID in common is assigned to the three containers providing a Firewall (FW) service.

Further, a controller managed by the carrier provider calculates a path for the E2E communication and sets the path into the edge router, by using the abstracted SIDs. With this arrangement, even when the identifier (the address/SID) of any of the SF instances is changed, the service provider does not need to notify the carrier provider of the identifiers of the individual SF instances. Further, because the abstracted SIDs are static, even when the identifier (the address/SID) of any of the SF instances is changed, no impact is imposed on path settings in the edge router. It is therefore possible to realize traffic steering in a stable manner.

The set of SF instances in an assignment range of the abstracted SID is not limited to those in mutually the same cluster NW or those providing mutually the same service. For example, it is also acceptable to assign the same abstracted SID to SF instances belonging to mutually the same hub.

In this situation, the hub denotes a network environment (or a system environment) including one or more physical hosts realizing the SF instances. Typical examples of the hub include a Data Center (DC). Other than DCs, for example, a network environment or a system environment realizing a cloud service may serve as a hub, and a network environment or a system environment realizing Mobile Edge Computing (MEC) may serve as a hub. In the embodiments hereinafter, examples in which a DC serves as the hub will be explained. It is assumed that the network environment in the DC is realized by using an Ethernet (registered trademark) Fabric.

<An Outline of Operations in the Hub>

To realize E2E communication between a terminal used by an end user (which hereinafter may simply be referred to as "user") and a server providing a cloud service as a public cloud, for example, via a specific SF instance, it is necessary to re-convert the abstracted SID into the identifier (the address/SID) of the SF instance.

Figure 3:
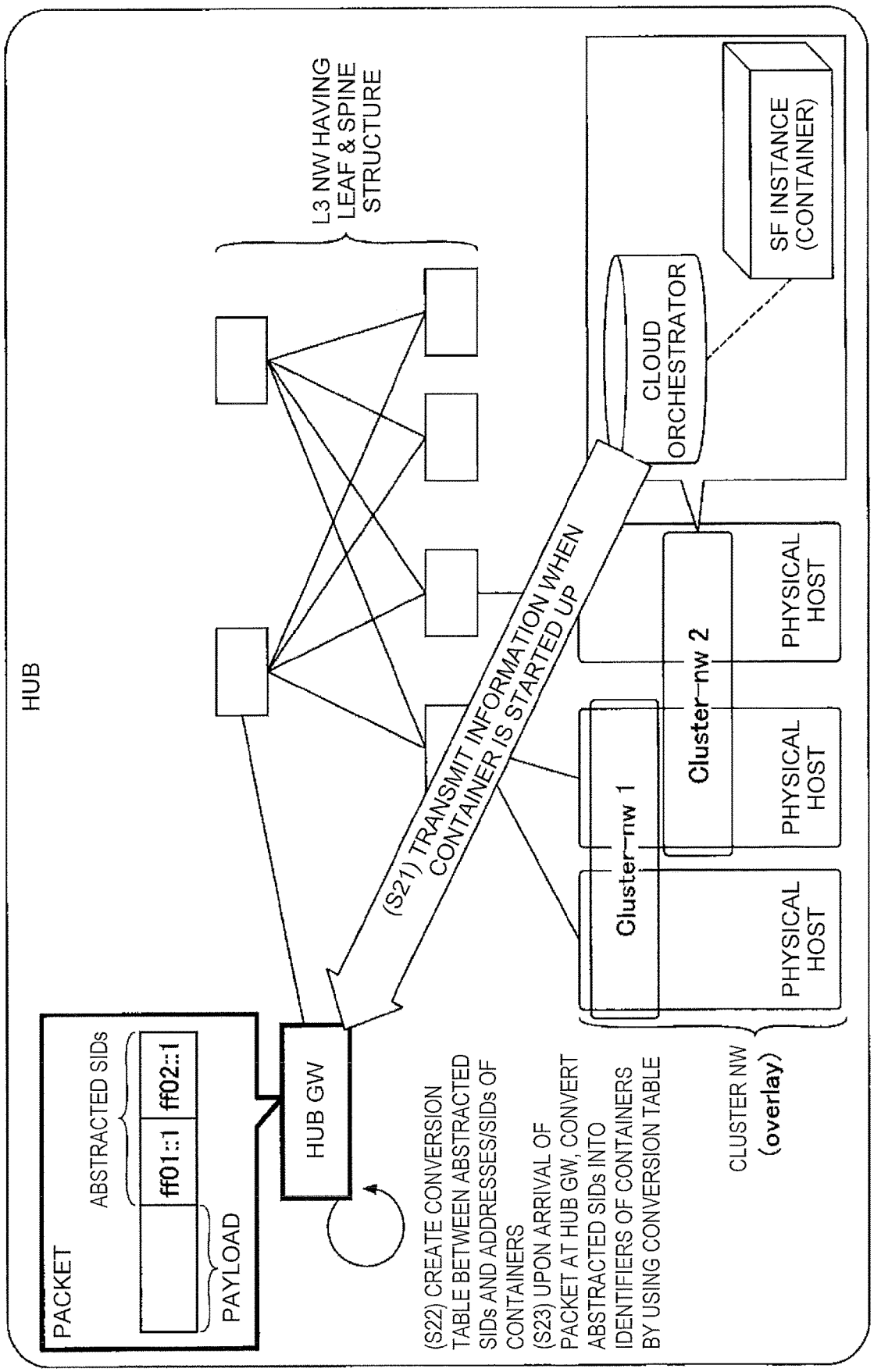
FIG. 3 is a diagram for explaining an example of an outline of operations in a hub.

Accordingly, in the present embodiment, a prescribed device (which will be referred to as a "hub GW") in the hub is configured to convert the abstracted SID into the identifier (the address/SID) of the SF instance. Operations performed in the hub in this situation will be explained, with reference to FIG. 3. FIG. 3 is a diagram for explaining an example of an outline of the operations in the hub. In the present example, the network environment in the hub is assumed to be an L3 network having a "leaf & spine" structure. As described later, there are multiple options for conversion methods and routing methods in the hub.

(S21): A cloud orchestrator (e.g., Kubernetes) that manages a container (an example of the SF instance) and cluster NWs transmits, at the time of starting up the container, information about the container (e.g., an identifier (an address/SID) of the container), to a hub GW.

(S22): The hub GW creates a conversion table keeping abstracted SIDs in correspondence with the identifiers of the containers.

(S23): After that, upon receipt of a packet, the hub GW converts the abstracted SIDs in a Destination Address (DA) or a Segment Routing Header (SRH) of the packet into the identifiers of the containers, by referring to the conversion table. As a result, the routing for the packet has been established up to the pertinent container.

<Dispensing the Abstracted SIDs and Sharing Information between the Providers>

Figure 4:
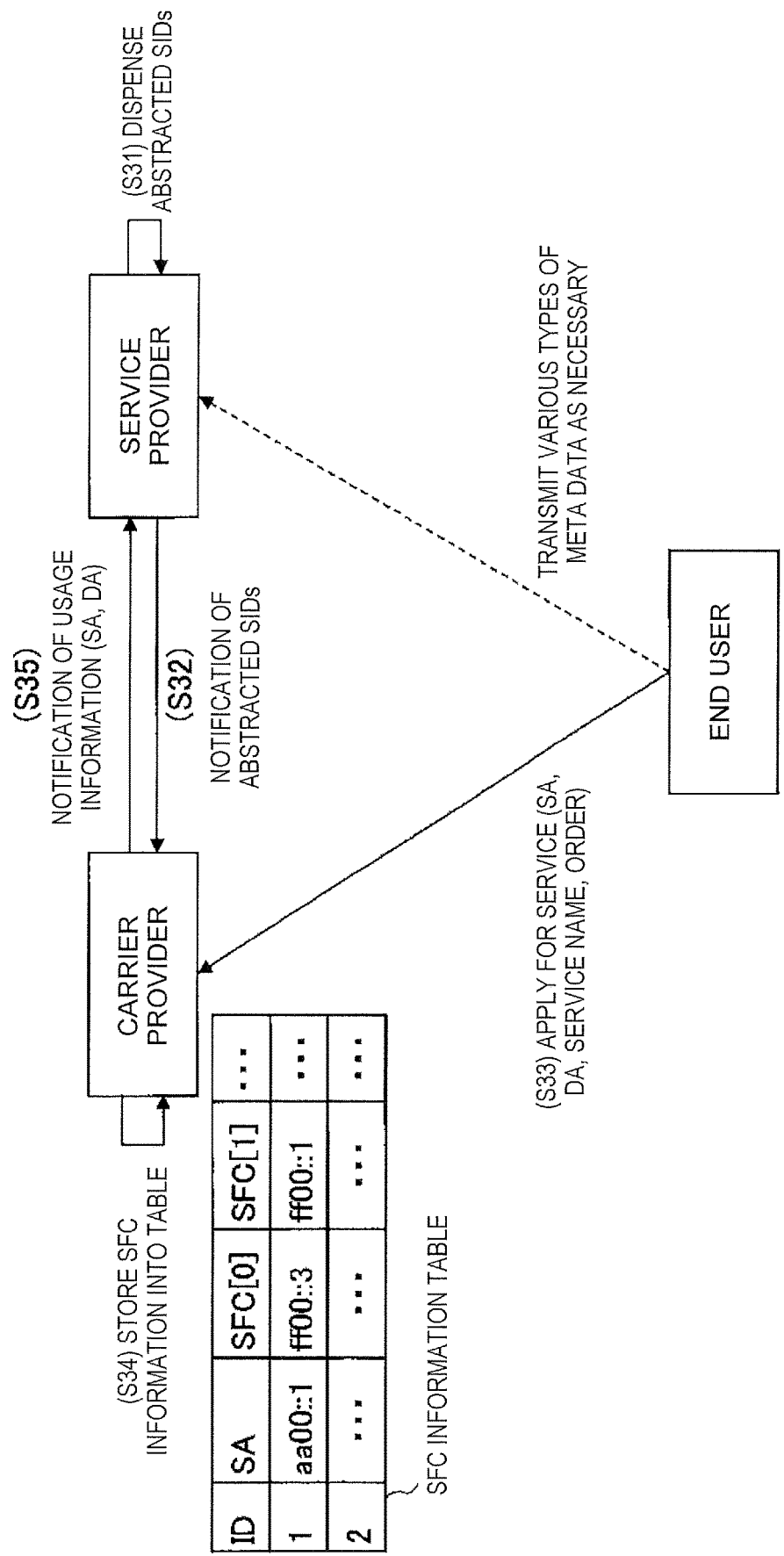
FIG. 4 is a diagram for explaining examples of dispensing the abstracted SIDs and sharing information between providers.

Next, an example of dispensing the abstracted SIDs and an example of sharing information necessary for the traffic steering between providers (the service provider and the carrier provider) will be explained with reference to FIG. 4. FIG. 4 is a diagram for explaining the examples of dispensing the abstracted SIDs and sharing the information between the providers.

(S31): The service provider assigns an abstracted SID to the set of SF instances (i.e., dispenses the abstracted SID). In this situation, it is not requisite for the service provider to dispense the abstracted SID; however, at the time of advertising the abstracted SID, i.e., issuing a notification about the abstracted SID, the dispensing makes it possible to aggregate routes for the advertisement. It is therefore desirable to dispense the abstracted SID from a global address owned by the service provider. The dispensing of the abstracted SID may be performed by an arbitrary device or machine managed by the service provider, for example.

(S32): The service provider notifies the carrier provider of the abstracted SIDs dispensed at S31 above.

(S33): Further, an end user submits an application for a service to the carrier provider. The application includes, for example, a Source Address (SA) indicating the address of a terminal used by the end user, a DA indicating the address of the communication destination to be communicated by E2E, the name of the service to be applied for, and the order of the service (i.e., the order of executing the SF instance in a service chain).

In this situation, the end user may submit the application for the service to the service provider, instead of submitting the application for the service to the carrier provider. It should be noted, however, that the information about the order of executing the SF instance is, generally speaking, information needed only by the carrier provider. Further, it is more efficient for the end user to submit the application only to the carrier provider, than to submit an application to each of a plurality of service providers. Accordingly, it is desirable when the end user submits the application to the carrier provider. The application for the service may be submitted, for example, from a terminal used by the end user or the like.

(S34): In response to the application for the service, the carrier provider creates Service Function Chaining (SFC) information and stores the created SFC information into an SFC information table. The SFC information includes at least the SA and an array or a list (SFC[0], SFC[1], . . . ) in which the identifiers of the SF instances, the service names, or the like are stored in the order of execution. The SFC information may include the DA. The creation of the SFC information and the storing thereof into the table may be performed by an arbitrary device or machine managed by the carrier provider, for example.

(S35): The carrier provider notifies the service provider of (advertises) a pair made up of the SA and the DA, as usage information of the service. As a result, the end user becomes able to use the service applied for. The notification about the usage information may be provided by an arbitrary device or machine managed by the carrier provider, for example.

When routing method 2 (explained later) is used as a routing method in the hub, the hub GW is managed by the carrier provider. Accordingly, in that situation, at S31 described above, it is desirable when the carrier provider dispenses the abstracted SIDs, instead of the service provider.

Further, for example, when using an SF that requires a more detailed setting (e.g., an SF for filtering ports unnecessary for work at an FW), the end user may transmit meta data for the setting or the like, to the service provider.

<Routing Methods>

Next, routing methods in the hub will be explained. Examples of the routing methods in the hub include routing method 1-*a*, routing method 1-*b*, routing method 2, and routing method 3, depending on various characteristics such as the position of the hub GW.

Routing methods 1-*a* and 1-*b* are methods that can be used when a hub GW is arranged in a location where the traffic of the hub is aggregated, while the carrier provider manages the hub GW. Further, routing method 2 is a method that can be used when a hub GW is arranged for each cluster NW in a distributed manner, while the carrier provider manages these hub GWs. In contrast, routing method 3 is a method that can be used when a hub GW is arranged for each cluster NW in a distributed manner, while the services manage these hub GWs. In the following sections, routing methods 1-*a* to 3 will be explained.

In the following sections, as an example, it is assumed that the network environment in the hub (the data center) is managed by using Kubernetes. Further, in the description of the routing methods below, the abstracted SIDs are converted into addresses/SIDs of the containers (SF instances). Details of the conversion will be explained later.

<<Routing method 1-*a*>>

Figure 5:
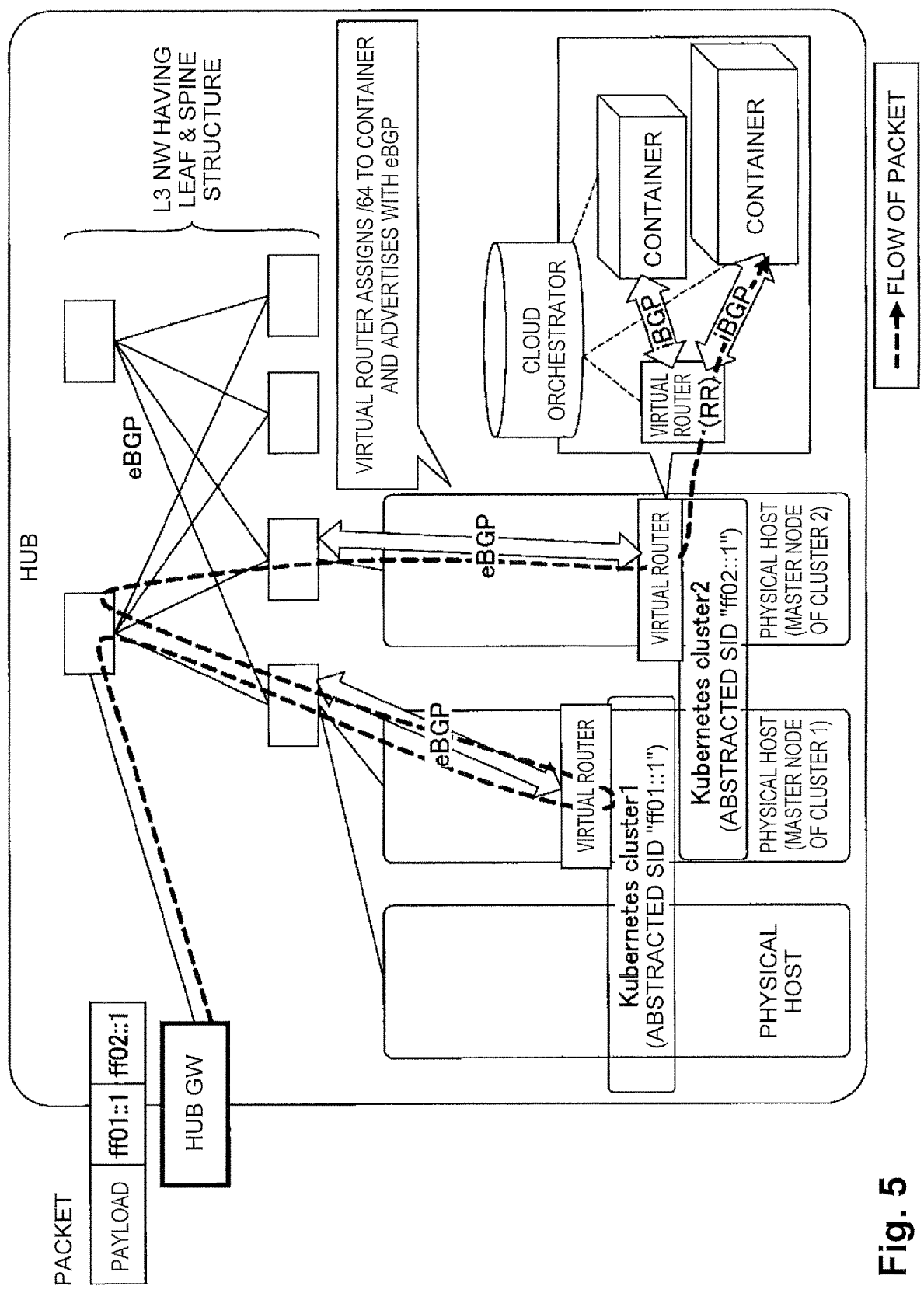
FIG. 5 is a diagram for explaining an example of routing method 1-a.

This method employs a hub GW (managed by the carrier provider) connecting cluster NWs in the hub together. Operations in this method will be explained, with reference to FIG. 5. FIG. 5 is a diagram for explaining an example of routing method 1-*a*.

According to this method, the address (/64) of the SF instance has been advertised to the network devices (e.g., leaf switches, spine switches, etc.) structuring the network environment in the hub and to all the cluster NWs, via virtual routers (typically, Container Networking Interfaces [CNIs] such as Calico nodes) connecting the cluster NWs to physical hosts and external networks, so that the routing at and beyond the hub GW is established by using only the identifiers (the addresses/SIDs) of the SF instances. In other words, as shown in FIG. 5, the virtual routers assign the address (/64) to the containers and advertise the address to the network devices and to the other cluster NWs (i.e., the other Kubernetes clusters) by using an External Border Gateway Protocol [BGP] (eBGP). At this time, the communication between the virtual routers and the containers is realized by an Internal BGP (iBGP). Although situations may vary depending on the CNI, a virtual router is provided in each of the physical hosts serving as master nodes of Kubernetes clusters (an example of the cluster NWs) or in each physical host.

According to this method, routing is established by performing S41 through S43 described below. As a premise, it is assumed that operations to be performed upon receipt of abstracted SIDs (i.e., an SR policy) are advertised in advance from the cloud orchestrator to the hub GW.

(S41): The hub GW advertises the abstracted SIDs and draws a packet of SFC into the hub GW.

(S42): The hub GW requests the addresses (or the SIDs) of the containers corresponding to the abstracted SIDs included in the header of the packet from the cluster NWs. As a result, the hub GW acquires the addresses (or the SIDs) of the containers, as a response to the request.

(S43): The hub GW replaces the abstracted SIDs in the header of the packet with the addresses of the containers. As a result, it is possible to establish routing from the hub GW to the containers straight through. Further, because the communication between the cluster NWs is able to use eBGP, it is possible to establish routing while using the addresses of the containers replaced at the hub GW.

The example in FIG. 5 shows the routing in a situation where the same abstracted SID "ff01::1" is assigned to the containers belonging to Kubernetes cluster 1, while the same abstracted SID "ff02::1" is assigned to the containers belonging to Kubernetes cluster 2 and where the hub GW has received a packet in which the abstracted SIDs "ff01::1" and "ff02::1" are set as SFC in the stated order. In this situation, after the addresses (or the SIDs) of the containers are acquired with the request at S42 described above, the plurality of abstracted SIDs "ff01::1" and "ff02::1" are simultaneously replaced with the addresses (or the SIDs) of the container at S43 described above. As a result, the routing (the flow of the packet) shown in FIG. 5 is realized.

<<Routing method 1-b>>

Figure 6:
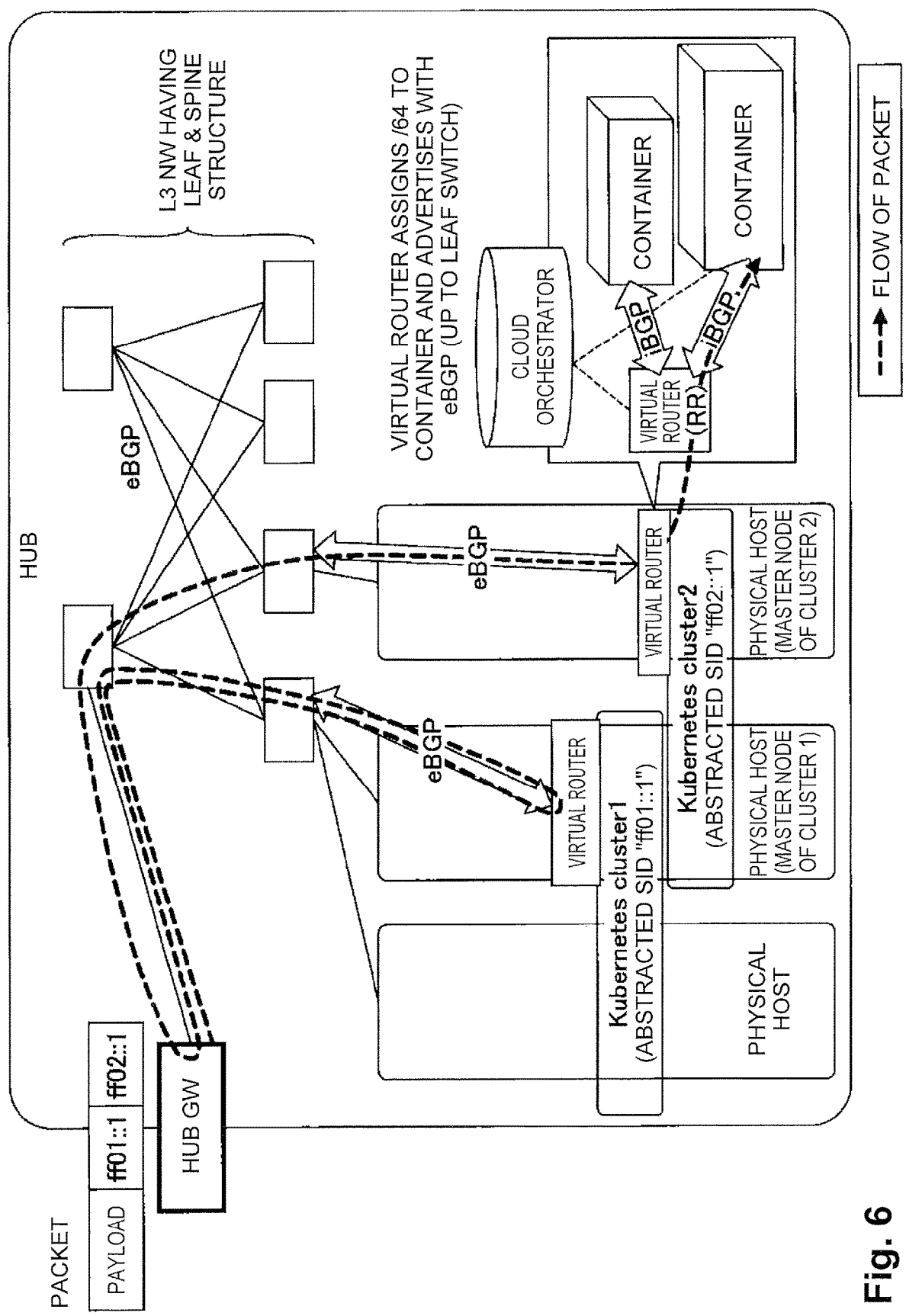
FIG. 6 is a diagram for explaining an example of routing method 1-b.

Similarly to routing method 1-a described above, according to this method the abstracted SIDs and the SIDs of the SF instances are converted by employing the hub GW (managed by the carrier provider) connecting the cluster NWs in the hub together. Routing method 1-a and routing method 1-b are different from each other for the ranges in which the SIDs of the SF instances are advertised. An operation according to routing method 1-b will be explained, with reference to FIG. 6. FIG. 6 is a diagram for explaining an example of routing method 1-b.

According to this method, to avoid the situation where, like in routing method 1-a, the SF instance is accessible from a DCNW, i.e., the network environment in the hub (the data center), routing is established so as to make a turn at the hub GW or at leaf switches. For this reason, according to this method, among the network devices structuring the network environment in the hub, the address (/64) of the SF instance is advertised to the network device serving as a leaf switch and to all the cluster NWs via virtual routers. Further, the hub GW establishes the routing by designating addresses of the leaf switch and the containers.

More specifically, as shown in FIG. 6, the virtual routers assign the address (/64) to the containers and advertise the address to the leaf switches and to the other cluster NWs via eBGP. In this situation, the virtual router and the containers communicate with each other via iBGP.

In this method, the routing is realized by performing S51 to S53 described below.

(S51): The hub GW advertises the abstracted SIDs and draws a packet of SFC into the hub GW.

(S52): The hub GW requests the addresses (or the SIDs) of the containers corresponding to the abstracted SIDs in the header of the packet from the cluster NWs. As a result, the hub GW acquires the addresses (or the SIDs) of the containers, as responses to the request.

(S53): The hub GW pops the abstracted SIDs from the header of the packet and stacks the address of a leaf switch (or the GW of the cluster NW) and the addresses (or the SIDs) of the containers on the header. As a result, between the cluster NWs, it is possible to establish routing via the hub GW and the leaf switch.

The example in FIG. 6 shows the routing in a situation where the same abstracted SID "ff01::1" is assigned to the containers belonging to Kubernetes cluster 1, while the same abstracted SID "ff02::1" is assigned to the containers belonging to Kubernetes cluster 2 and where the hub GW has received a packet in which the abstracted SIDs "ff01::1" and "ff02::1" are set as SFC in the stated order. In this situation, after the addresses (or the SIDs) of the containers are acquired with the request at S52 described above, the abstracted SIDs are popped from the header of the packet at S53, so that the address of the leaf switch (or the GW of the cluster NW) and the addresses (or the SIDs) of the containers are stacked on the header. As a result, the routing (the flow of the packet) shown in FIG. 6 is established.

<<Routing Method 2>>

Figure 7:
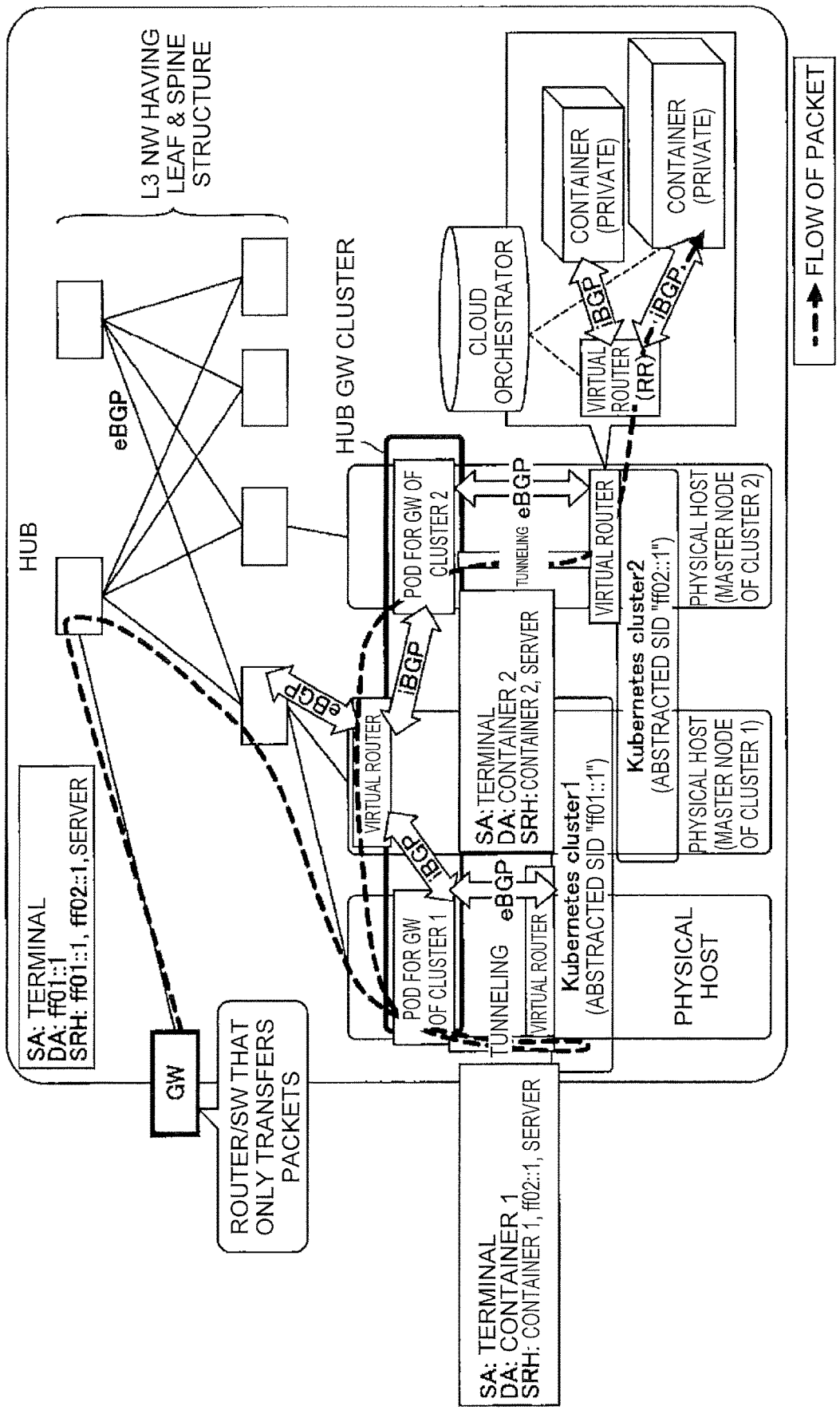
FIG. 7 is a diagram for explaining an example of routing method 2.

This method employs hub GWs (managed by the carrier provider) each provided for a different one of cluster NWs in a distributed manner. Operations according to this method will be explained, with reference to FIG. 7. FIG. 7 is a diagram for explaining an example of routing method 2. The hub GWs each provided for a different one of the cluster NWs in the distributed manner will collectively be referred to as a "hub GW cluster".

Each of the hub GWs is realized with a Kubernetes pod (a group made up of one or more containers). The hub GW arranged with Kubernetes cluster 1 may be referred to as a "pod for the GW of cluster 1". The hub GW arranged with Kubernetes cluster 2 may be referred to as a "pod for the GW of cluster 2".

According to this method, a hub GW is provided for each cluster. Communication between an L3 NW having a leaf & spine structure and a cluster NW and communication between cluster NWs are always routed via a hub GW. Further, the connection from each of the hub GWs to a cluster NW (managed by the service provider) is realized with a tunnel using Virtual eXtensible Local Area Network (VXLAN) or the like, for example.

According to this method, the routing is established by performing S61 through S64 described below.

(S61): Each of the hub GWs (e.g., the pod for the GW of cluster 1, the pod for the GW of cluster 2) advertises the abstracted SIDs of services present in a corresponding cluster NW.

(S62): The routing from the GW (a router or a switch that only simply transfers a packet) to each of the hub GWs is established by using the abstracted SIDs. The GW denotes a router or a switch that only simply transfers a packet between the network environment in the hub and a network environment outside the hub.

(S63): The hub GW that received the packet requests the addresses (or the SIDs) of the containers from the cloud orchestrator of each cluster NW. As a result, the hub GW acquires the addresses (or the SIDs) of the containers, as a response to the request.

(S64): The hub GW transfers the packet to the containers in a cluster NW corresponding to the hub GW via a tunnel (e.g., a VXLAN or Generic Routing Encapsulation [GRE]). Further, when a packet is transferred between cluster NWs, the packet is routed via a hub GW cluster.

The example in FIG. 7 shows the routing in a situation where the same abstracted SID "ff01::1" is assigned to the containers belonging to Kubernetes cluster 1, while the same abstracted SID "ff02::1" is assigned to the containers belonging to Kubernetes cluster 2 and where the GW has received a packet in which the abstracted SIDs "ff01::1" and "ff02::1" are set as SFC in the stated order.

In this situation, as a result of the advertisement of the abstracted SIDs at S61 described above, the packet is drawn into the hub GW pod. Further, after the addresses of the containers in the same cluster NW are acquired with the request S63 described above, the hub GW pod converts the DA into the address of the corresponding container, by implementing End.B6.Encaps or Network Address Translation (NAT). After that, the pertinent hub GW pod transfers the packet to the corresponding container.

After that, the pertinent hub GW transfers the packet to container 1, via a tunnel and a virtual router.

Container 1 that received the packet implements End (an Endpoint function). As a result, the DA resulting from SF processing at container 1 is "ff02::1". Subsequently, container 1 transmits the packet up to the pod for the GW of cluster 1 by using a default route.

Subsequently, the pod for the GW of cluster 1 that received that packet transmitted thereto from container 1 transfers the packet to a hub GW (the pod for the GW of cluster 2) corresponding to Kubernetes cluster 2, by using iBGP.

After that, similarly to the pod for the GW of cluster 1, the pod for the GW of cluster 2 acquires the address of container 2 and subsequently converts the DA to the address of container 2 by implementing End.B6.Encaps. As a result, the packet is transferred to container 2 via a tunnel and a virtual router, so that the routing (the flow of the packet) shown in FIG. 7 is realized.

<<Routing Method 3>>

Figure 8:
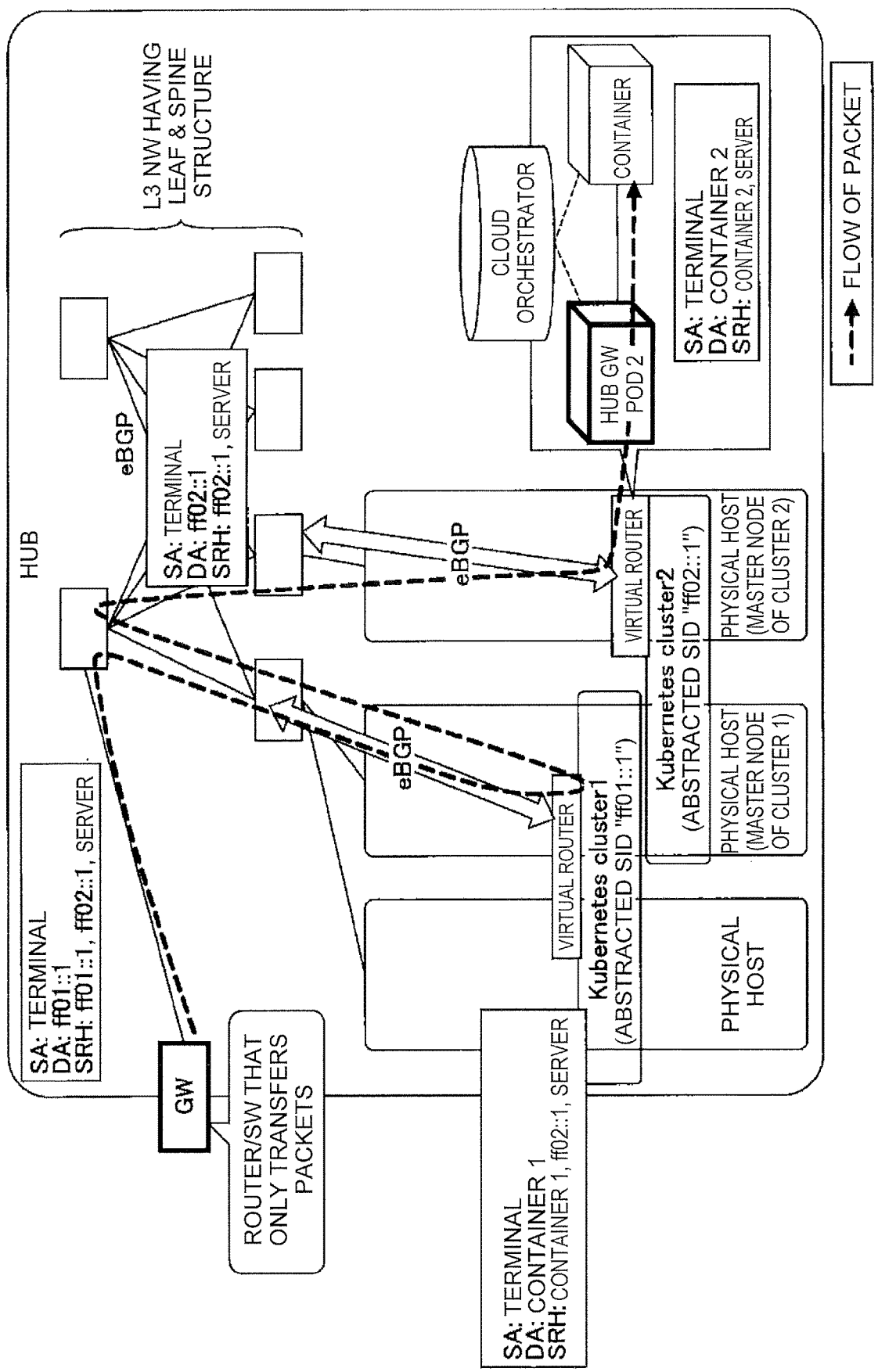
FIG. 8 is a diagram for explaining an example of routing method 3.

This method uses hub GWs (managed by the service provider) each provided for a different one of cluster NWs in a distributed manner. Operations according to this method will be explained, with reference to FIG. 8. FIG. 8 is a diagram for explaining an example of routing method 3. Each of the hub GWs is realized with a Kubernetes pod. The hub GW arranged with Kubernetes cluster 1 may be referred to as "hub GW pod 1". The hub GW arranged with Kubernetes cluster 2 may be referred to as "hub GW pod 2".

According to this method, the addresses of the hub GW pods are advertised by using a virtual router or the like, so that E2E communication is established by removing the abstracted SIDs and encapsulating the addresses (or the SIDs) of the containers at the time when any of the hub GW pods has received a packet.

According to this method, the routing is established by performing S71 through S74 described below.

(S71): Each of the hub GWs (e.g., hub GW pod 1, hub GW pod 2) advertises the abstracted SIDs. In this situation, each of the hub GWs advertises loopback addresses as the abstracted SIDs by using iBGP for the inside of the cluster NW and by using eBGP for the outside of the cluster NW. As a result, a packet is drawn into a pertinent hub GW pod. In other words, the packet is transferred from a GW, which is a router or a switch that only simply transfers the packet, or from another hub GW pod to the pertinent hub GW pod.

(S72): The hub GW pod that has received the packet requests the addresses (or the SIDs) of the containers from the cloud orchestra of the same cluster NW. As a result, the pertinent hub GW pod acquires the addresses (or the SIDs) of the containers in the same cluster NW as a response to the request.

(S73): The pertinent hub GW pod converts the abstracted SID in the header of the packet into the address of the corresponding container before transmitting the packet. As a result, the packet is transferred to the corresponding container.

(S74): Further, when a new abstracted SID becomes a DA, the hub GW pod transmits the packet up to a hub GW pod advertising the corresponding abstracted SID. As a result, the packet is transferred up to the next hub GW pod.

The example in FIG. 8 shows the routing in a situation where the same abstracted SID "ff01::1" is assigned to the containers belonging to Kubernetes cluster 1, while the same abstracted SID "ff02::1" is assigned to the containers belonging to Kubernetes cluster 2 and where the GW has received a packet in which the abstracted SIDs "ff01::1" and "ff02::1" are set as SFC in the stated order.

In this situation, as a result of the advertisement of the abstracted SIDs at S71, the packet is drawn into the hub GW pod. Further, after the addresses of the containers in the same cluster NW are acquired with the request at S72 described above, the hub GW pod converts the DA into the address of the corresponding container, by implementing End.B6.Encaps or Network Address Translation (NAT). After that, the pertinent hub GW pod transfers the packet to the corresponding container.

The container that has received the packet implements End (an Endpoint function). As a result, the DA resulting from SF processing at the container is converted into another abstracted SID. Subsequently, the container transmits the packet up to the hub GW pod in the same cluster NW by using a default route.

Subsequently, the hub GW pod that has received the packet transmitted thereto from the container in the same cluster NW transfers the packet to a hub GW pod in another cluster NW via an L3 NW having a leaf & spine structure. As a result, the routing (the flow of the packet) shown in FIG. 8 is realized.

<Conversion Methods>

Next, methods for converting an abstracted SID into an identifier (an address/SID) of an SF instance (e.g., a container or a VM) will be explained. Possible conversion methods include a NAT-based conversion method (conversion method 1) and a conversion method using the End Function of SRv6 (conversion method 2). The following sections will describe these conversion methods. The conversion from an abstracted SID into an identifier of an SF instance may performed at the hub GW shown in FIG. 5 and FIG. 6, the hub GW cluster shown in FIG. 7, or the hub GW pod shown in FIG. 8.

<<Conversion Method 1>>

In this method, the conversion is NAT-based. According to this method, the DA in the header of a packet is converted by using a NAT function provided for the hub GW (Note that the SRH is not rewritten). In this situation, according to this method, the DA in the header is converted by using a table (a conversion table) keeping DAs before and after a conversion in correspondence with each SA. In this situation, the hub GW performs no SRv6 processing (e.g., End [an Endpoint function], T [Transit behavior], etc.), but forwards the packet to a container using the NA-converted DA.

An example of the conversion table is shown in FIG. 9. FIG. 9 is a drawing for explaining the example of the conversion table. As shown in FIG. 9, in the conversion table, a DA (a pre-conversion DA) and a post-conversion DA are kept in correspondence with each SA. In this situation, an abstracted SID is set as each of the pre-conversion DAs, whereas the address (or the SID) of a container (an SF instance) is set as each of the post-conversion DAs. Accordingly, the hub GW is able to convert each abstracted SID into the identifier (the address/SID) of the SF instance, in accordance with the SA of the packet.

The cloud orchestrator has the addresses of the users subscribing to services and information about the addresses/SIDs of the containers that are SF instances. For this reason, the hub GW is able to create the abovementioned conversion table, by acquiring these pieces of information from the cloud orchestrator and storing the correspondence relationship between the addresses of the users and the addresses of the containers.

Figure 10:
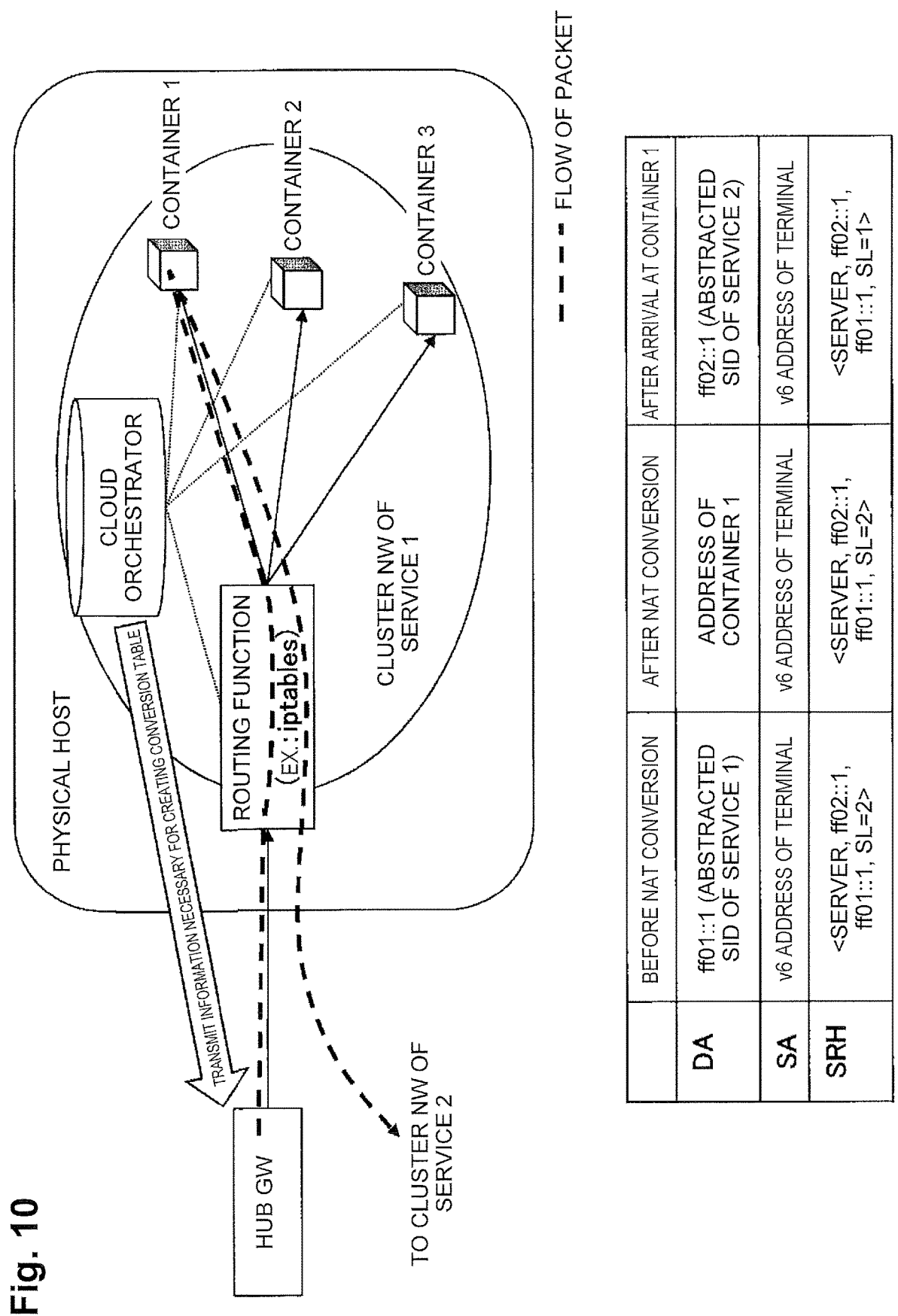
FIG. 10 is a diagram for explaining an example of conversion method 1.

For example, let us discuss an example in which, as shown in FIG. 10, after a packet is transferred to container 1 belonging to the cluster NW of service 1, the packet is transferred to a certain container belonging to the cluster NW of service 2. In this situation, after a routing function (e.g., iptables of Linux (registered trademark)) of the cluster NW of service 1 transfers the packet received from the hub GW to container 1, the packet is further transferred to the cluster NW of service 2.

In this situation, for example, before the NAT conversion at the hub GW, the DA is "ff01::1 (the abstracted SID of service 1)"; the SA is "the v6 address of the terminal"; and the SRH is "<server, ff02::1, ff01::1, SL=2>". After the NAT conversion, the DA is "the address of container 1"; the SA is "the v6 address of the terminal"; and the SRH is "<server, ff02::1, ff01::1, SL=2>". After the arrival at container 1, the DA is "ff02::1 (the abstracted SID of service 2)"; the SA is "the v6 address of the terminal"; and the SRH is "<server, ff02::1, ff01::1, SL=1>". The symbol "SL" denotes an index indicating the SID currently set with the DA in the segment list of the SRH.

From among the DAs, the SAs, and the SRHs above, the cloud orchestrator acquires the information about the DAs, the SAs, and the SRHs after the NAT conversion and after the arrival at container 1 from the routing function and container 1 and further transmits, to the hub GW, the acquired information as information necessary for creating the conversion table. Accordingly, the hub GW is able to create the conversion table. The information about the DAs, the SAs, and the SRHs before the NAT conversion is held by the hub GW.

More specifically, it is possible to create a record in the conversion table by referring to the information before and after the NAT conversion and bringing the SA "v6 address of the terminal", the DA "ff01::1 (the abstracted SID of service 1)", and the post-conversion DA "the address of container 1" into correspondence with one another.

<<Conversion Method 2>>

This conversion method uses the End Function of SRv6. According to this method, the hub GW encapsulates an IPv6 header and an SRH and converts the DA in a new IPv6 header into the address (or the SID) of a container (Note that the SA is not converted). Further, a container that has received a packet refers to a My Local SID Table, for example, and implements END so as to convert the DA into the abstracted SID of the next service.

A method for inputting an SR policy can be explained as follows: For example, the cloud orchestrator acquires the correspondence relationship (e.g., the conversion table shown in FIG. 9) between the addresses of the users and the addresses (or the SIDs) of the containers. Further, the cloud orchestrator and the hub GW are connected to each other by using Path Computation Element Protocol (PCEP). (In this situation, the hub GW serves as a Path Computation Client [PCC]). Accordingly, by using PCEP, it is possible to input a pair made up of an SID and a function as a policy. For PCEP, see the reference literature listed below.

REFERENCE LITERATURE

PCEP Extensions for Segment Routing leveraging the IPv6 data plane draft-negi-pce-segment-routing-ipv6-04

Figure 11:
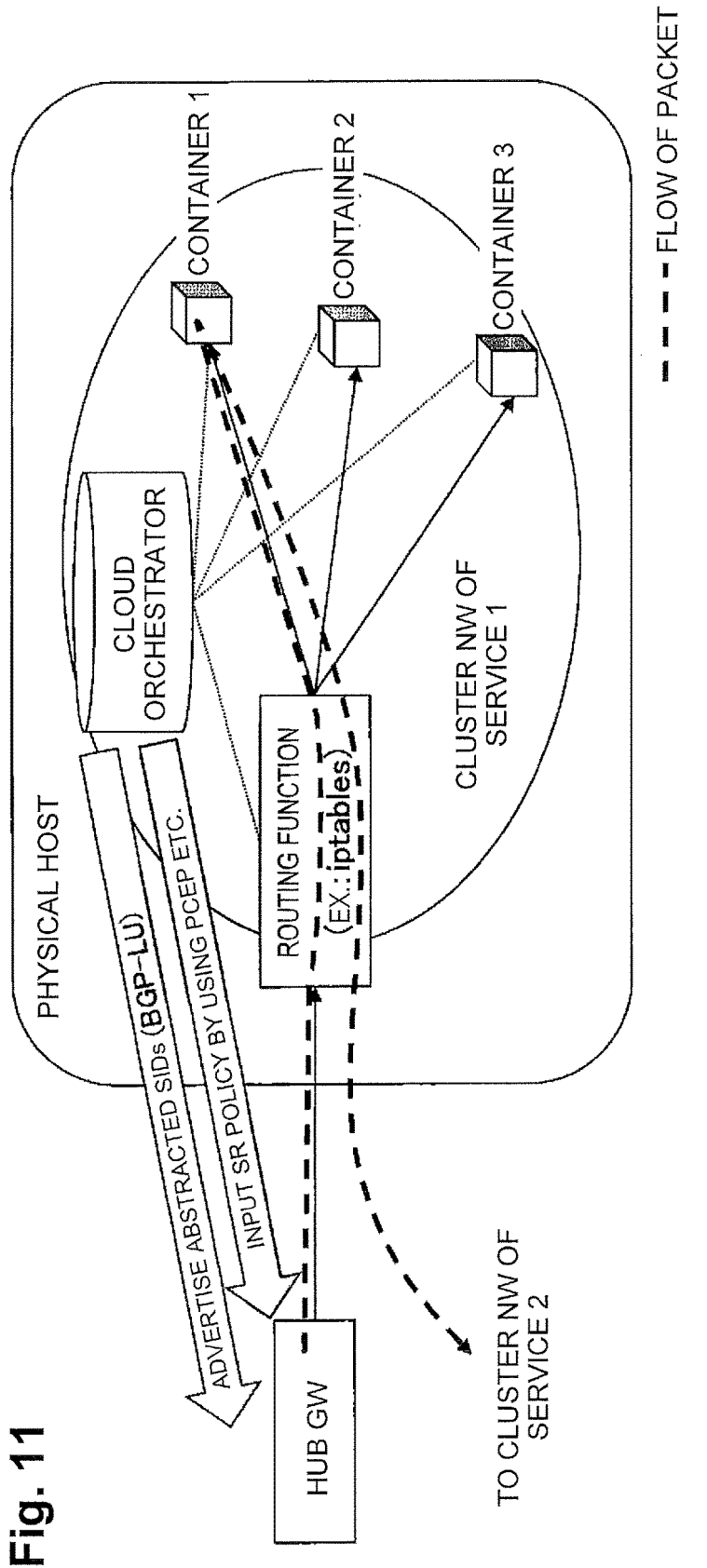
FIG. 11 is a diagram for explaining an example of conversion method 2.

For example, let us discuss a situation in which, as shown in FIG. 11, after a packet is transferred to container 1 belonging to the cluster NW of service 1, the packet is transferred to a certain container belonging to the cluster NW of service 2. In this situation, after a routing function of the cluster NW of service 1 transfers the packet received from the hub GW to container 1, the packet is further transferred to the cluster NW of service 2. The cloud orchestrator advertises the abstracted SIDs to the hub GW by using BGP Labeled Unicast (BGP-LU), for example, and also inputs an SR policy to the hub GW.

In this situation, for example, before End.B6.Encaps is implemented at the hub GW, the DA is "ff01::1 (the abstracted SID of service 1)"; the SA is "the v6 address of the terminal"; and the SRH is "<server, ff02::1, ff01::1, SL=2>". After End.B6.Encaps is implemented, the DA is "the address of container 1"; the SA is "the v6 address of the terminal"; and the SRH is "<server, ff02::1, ff01::1, SL=2>" and "the SID of container 1, SL=0". After the arrival at container 1, the DA is "ff02::1 (the abstracted SID of service 2)"; the SA is "the v6 address of the terminal"; and the SRH is "<server, ff02::1, ff01::1, SL=1>".

As explained above, according to this method, after encapsulating the packet by implementing End.B6.Encaps at the hub GW, the address of the container is used as the DA in the new header. Accordingly, the cloud orchestrator advertises and inputs, in advance, the abstracted SIDs and the SR policy for this purpose to the hub GW.

<An Overall Configuration of the Communication System 1>

Figure 12:
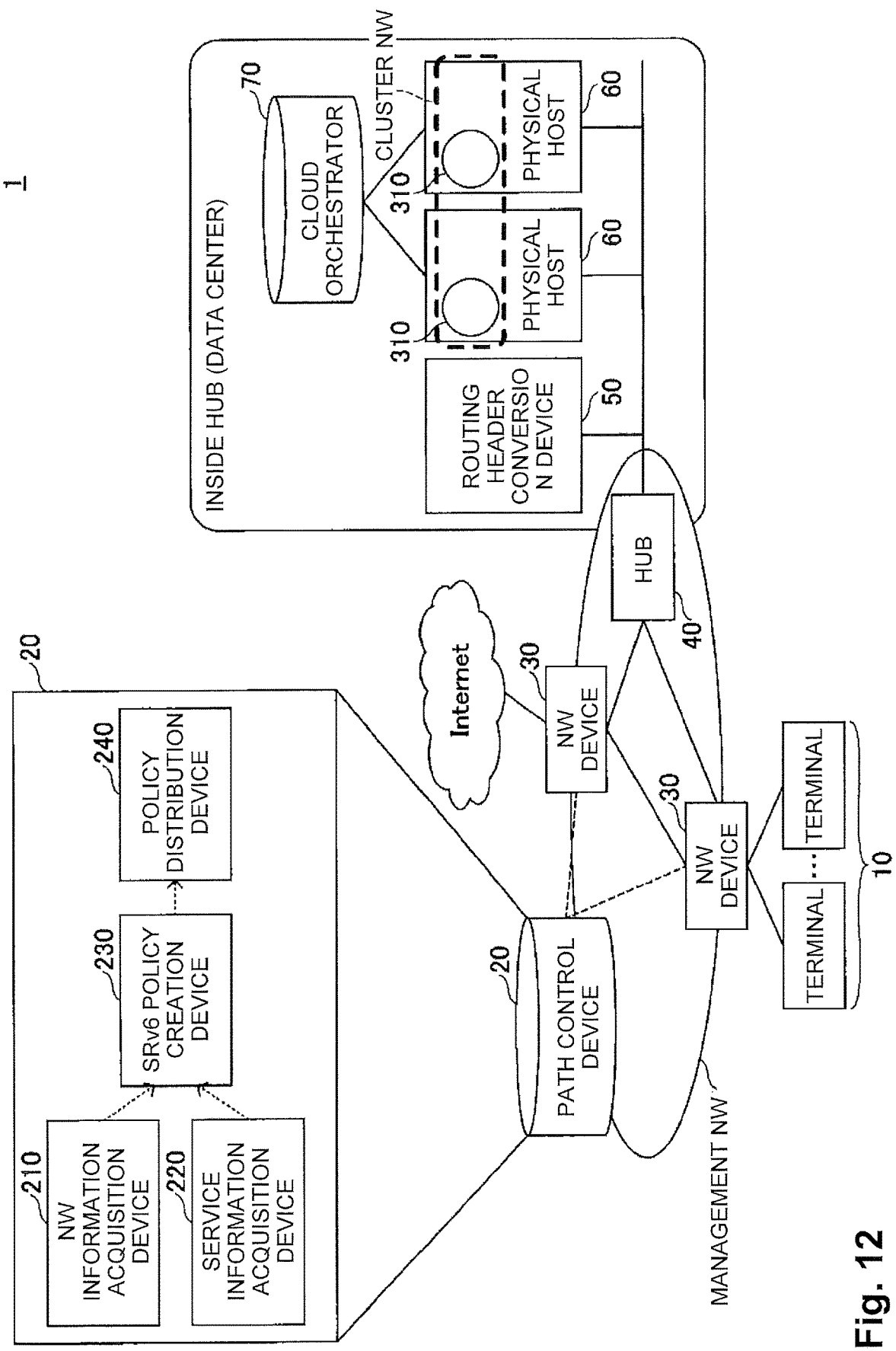
FIG. 12 is a diagram for explaining an example of an overall configuration of a communication system according a present embodiment.

Next, an overall configuration of the communication system 1 according to the present embodiment will be explained, with reference to FIG. 12. FIG. 12 is a diagram for explaining an example of the overall configuration of the communication system 1 according the present embodiment.

As shown in FIG. 12, the communication system 1 according to the present embodiment includes terminals 10, a path control device 20, NW devices 30, and a hub 40. The path control device 20, the NW devices 30, and the hub 40 are machines and/or devices installed in a management NW or form a network environment structuring a part of a management NW environment (or a network environment included in a management NW environment).

The management NW denotes an IPv6 network such as an access network connected to a user network, a data center, and the Internet. The management NW is configured so as to include the plurality of NW devices 30 and links connecting therebetween. The terminals 10 that are able to connect to the management NW are devices that transmit data (packets) and are used by end users. It is possible to use arbitrary devices as the terminals 10, and the types thereof and the communication characteristics thereof (e.g., the communication interval, the number of destinations, and the packet sizes) are not limited.

Figure 1:
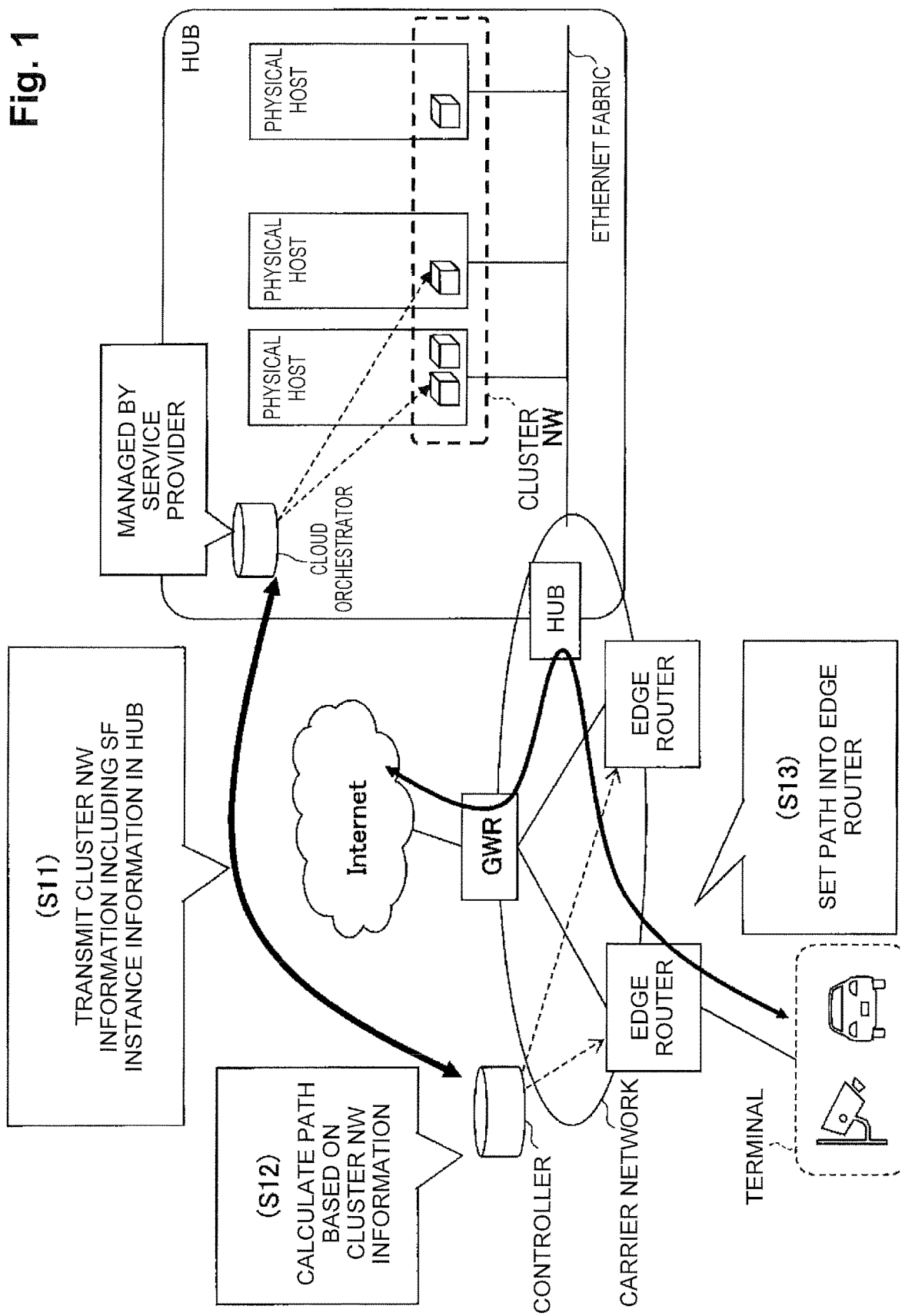
FIG. 1 is a diagram for explaining an example of setting a path in SRv6.

The carrier network shown in FIG. 1 and so on corresponds to the management NW. Further, the edge router and the GWR in FIG. 1 and so on, as well as various types of network devices (not shown) structuring the carrier network correspond to the NW devices 30. The terminals in FIG. 1 and so on correspond to the terminals 10.

The hub 40 is a Data Center (DC), for example. In the network environment on the inside thereof, a plurality of physical hosts (computer nodes) 60 are connected using a fabric structure. A cloud orchestrator 70 is realized with Kubernetes, for example, and manages virtual hosts 310 in the physical hosts 60 and cluster NWs. The virtual hosts 310 may each be an SF instance such as a container or a VM, for example. The virtual hosts 310 and the cluster NWs provide services. In the following sections, the virtual hosts 310 are assumed to be containers and may be referred to as "containers 310".

A routing header conversion device 50 has a routing function and converts a parameter (e.g., a DA) in a routing header (i.e., an IPv6 header or an SRH) of a received packet and forwards the packet. The hub GW in FIGS. 3, 5, and 6, the hub GW cluster in FIG. 7, and the hub GW pod in FIG. 8 each correspond to the routing header conversion device 50 (or a program or a function realizing the routing header conversion device 50).

The path control device 20 is in a peer relationship with the NW devices 30 in the management NW, for example, and sets a path for E2E communication in the NW devices 30. Further, the controller in FIG. 1 and so on corresponds to the path control device 20. For example, the path control device 20 is configured so as to include a NW information acquisition device 210, a service information acquisition device 220, an SRv6 policy creation device 230, and a policy distribution device 240.

The NW information acquisition device 210 acquires information about the management NW and the network inside the hub 40. The service information acquisition device 220 acquires information about services, and the like. The SRv6 policy creation device 230 creates a path for each of the terminals 10, on the basis of network information, service information, and the like. The policy distribution device 240 sets the paths in the NW devices 30.

<<A Functional Configuration of the NW Information Acquisition Device 210>>

Figure 13:
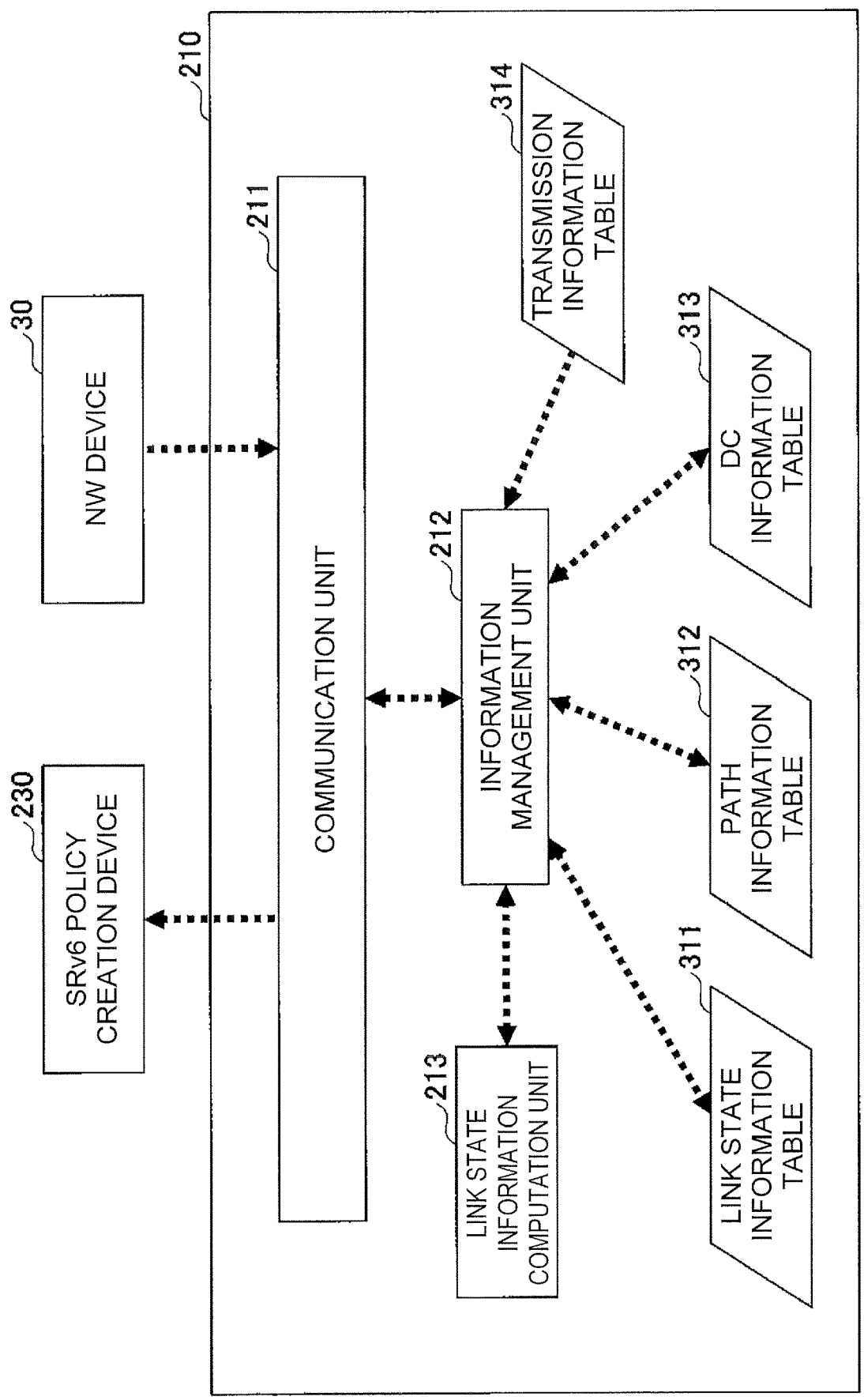
FIG. 13 is a diagram for explaining an example of a functional configuration of a NW information acquisition device.

A functional configuration of the NW information acquisition device 210 according to the present embodiment will be explained, with reference to FIG. 13. FIG. 13 is a diagram for explaining an example of the functional configuration of the NW information acquisition device 210.

As shown in FIG. 13, the NW information acquisition device 210 according to the present embodiment includes, as functional units thereof, a communication unit 211, an information management unit 212, and a link state information computation unit 213. These functional units are realized by processes executed by a processor or the like, for example.

Further, the NW information acquisition device 210 according to the present embodiment has a link state information table 311, a path information table 312, a DC information table 313, and a transmission information table 314. These tables are stored in a storage device, or the like.

The communication unit 211 communicates with the NW device 30, the SRv6 policy creation device 230, and the like. The information management unit 212 manages various types of tables. The link state information computation unit 213 performs computation such as sorting that uses the SIDs as a key, for example.

By employing the communication unit 211, the NW information acquisition device 210 according to the present embodiment acquires link state information of Interior Gateway Protocol (IGP) and path information of BGP and IP, from the NW device 30 such as a router in the management NW, by using a protocol such as BGP-LS. On the link state information, computation such as sorting that uses SIDs as a key is performed by the link state information computation unit 213, before the link state information is stored into the link state information table 311 by the information management unit 212. Further, the path information is stored into the path information table 312 by the information management unit 212.

The DC information table 313 has DC information stored therein. The DC information may be, for example, information about an Autonomous System (AS) to which the hub 40 (the data center) is connected, information about the SID of a router serving as a gateway for the data center provided on the management NW side, and the like.

Further, by referring to transmission information stored in the transmission information table 314 by the information management unit 212, the NW information acquisition device 210 according to the present embodiment determines a range (a range of the data) of transmission of the link state information, the path information, and the DC information to the SRv6 policy creation device 230. Further, by employing the communication unit 211, the NW information acquisition device 210 according to the present embodiment transmits the link state information, the path information, and the DC information in the determined range to the SRv6 policy creation device 230. In this situation, all the information may be transmitted to the SRv6 policy creation device 230 every time or only the difference from the information transmitted in the previous transmission may be transmitted to the SRv6 policy creation device 230.

An example of the link state information table 311 is shown in FIG. 14. As shown in FIG. 14, each of the pieces of link state information stored in the link state information table 311 includes an SID, an SID attribute, and state information. In this situation, the link state information table 311 stores therein the link state information which was acquired from the NW device 30 by using BGP-LS or the like and on which the computation such as sorting that uses SIDs as a key has been performed.

Further, an example of the path information table 312 is shown in FIG. 15. As shown in FIG. 15, each of the pieces of path information stored in the path information table 312 includes a prefix, a router-ID/originator, information in the previous transmission, and the difference from the previous transmission. In other words, the path information is information stored in a BGP table and information stored in an IP route table. Further, the path information includes information indicating whether or not there is a difference from the previous transmission, and if there is, the information transmitted in the previous transmission.

Further, an example of the DC information table 313 is shown in FIG. 16. As shown in FIG. 16, each of the pieces of DC information stored in the DC information table 313 includes a connection destination AS and an SID. In other words, the DC information includes information indicating to which AS (a sub AS) each of the hubs 40 (the data centers) is connected and the SID of the router serving as a gateway for the data center provided on the management NW side. When a packet is to be drawn into a specific hub 40 (a data center) by using SRv6, these pieces of information are used for setting a path while designating a router serving as an entrance.

Further, an example of the transmission information table 314 is shown in FIG. 17. As shown in FIG. 17, each of the pieces of transmission information stored in the transmission information table 314 includes an item and a setting value. Examples of the item include a data transmission interval and a transmission data range. A setting value corresponding to each of the items is stored as the setting value. In this situation, as setting values of the data transmission intervals, for example, data transmission intervals such as "30 seconds" and "60 seconds" may be set. As the transmission data ranges, for example, "transmit all data", "transmit only such data that has a difference", or "transmit only the data in a specific area" may be set.

<<A Functional Configuration of the Service Information Acquisition Device 220>>

Figure 18:
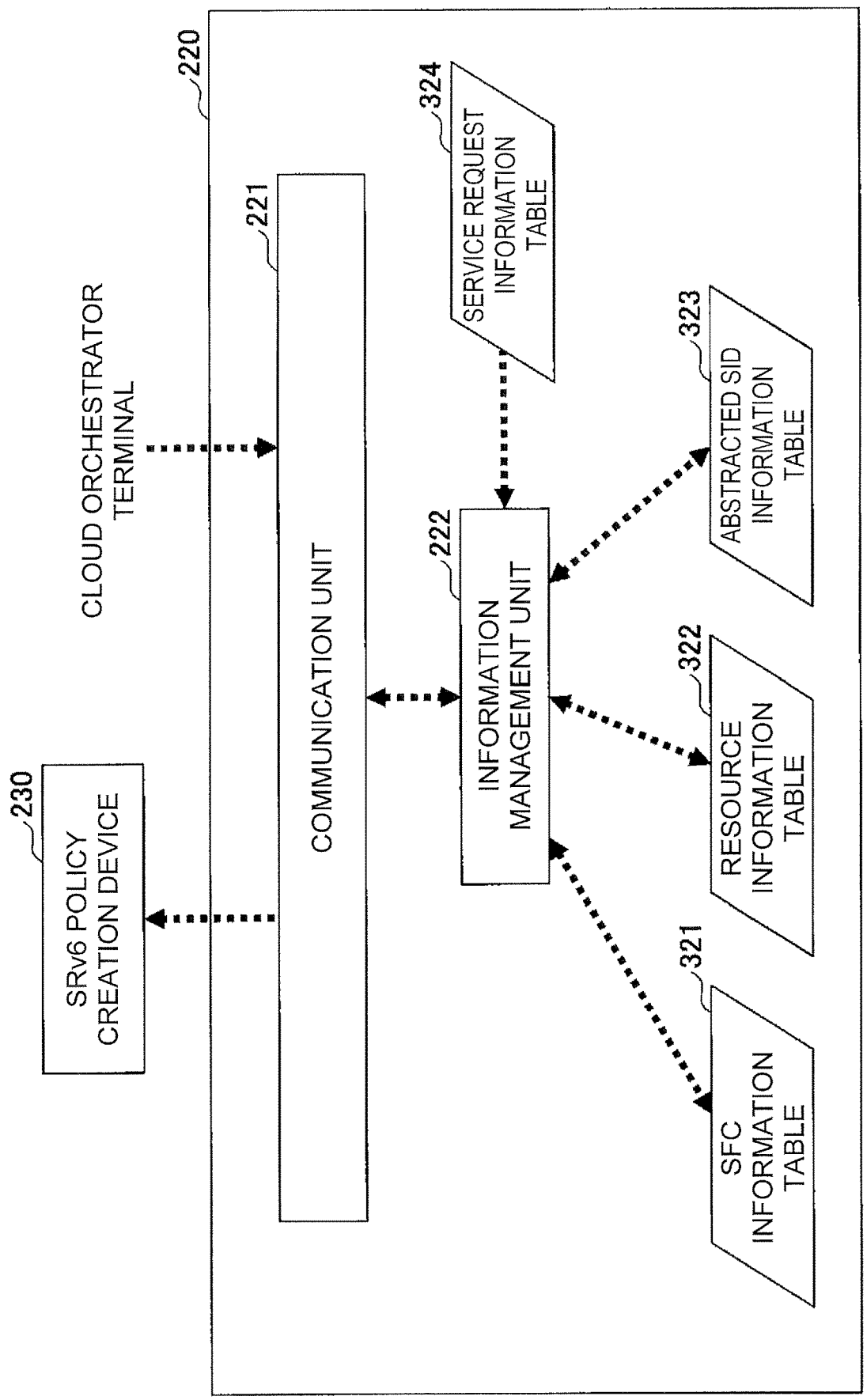
FIG. 18 is a diagram for explaining an example of a functional configuration of a service information acquisition device.

A functional configuration of the service information acquisition device 220 according to the present embodiment will be explained, with reference to FIG. 18. FIG. 18 is a diagram for explaining an example of the functional configuration of the service information acquisition device 220.

As shown in FIG. 18, the service information acquisition device 220 according to the present embodiment includes, as functional units thereof, a communication unit 221 and an information management unit 222. These units are realized by processes executed by a processor or the like, for example.

Further, the service information acquisition device 220 according to the present embodiment has an SFC information table 321, a resource information table 322, an abstracted SID information table 323, and a service request information table 324. These tables are stored in a storage device or the like.

The communication unit 221 communicates with the SRv6 policy creation device 230, the cloud orchestrator 70, the terminals 10, and the like. The information management unit 222 manages various types of tables.

By employing the communication unit 211, the service information acquisition device 220 according to the present embodiment acquires information held by the service provider and the end users from the cloud orchestrator 70, the terminals 10, and the like (or receives information transmitted or provided in notifications from the cloud orchestrator 70, the terminals 10, and the like).

The SFC information table 321 has stored SFC information therein. The SFC information denotes information about service function chaining requested by an end user of a service.

The resource information table 322 has stored therein resource information. The resource information table indicates information about an excess resource amount of the service provided at the hub 40.

The abstracted SID information table 323 has stored abstracted SID information therein. The abstracted SID information denotes the abstracted SID of the service. In other words, in the present embodiment, the assignment range of the abstracted SID is each service.

The service request information table 324 has stored service request information therein. The service request information denotes information about a tolerance delay period of the service and a resource load distribution, and the like.

An example of the SFC information table 321 is shown in FIG. 19. As shown in FIG. 19, each of the pieces of SFC information stored in the SFC information table 321 includes the SA of a user and information about service function chaining for the user. In this situation, SFC[i] denotes information about the i-th service function chaining. When the same service function is deployed at a plurality of hubs 40, the SRv6 policy creation device 230 creates an SRv6 policy by determining from which hub 40 the service function will be used, while taking the excess resource amount into consideration, on the basis of the SFC information and the resource information (explained later).

Further, an example of the abstracted SID information table 323 is shown in FIG. 20. As shown in FIG. 20, each of the pieces of abstracted SID information stored in the abstracted SID information table 323 includes a service and an abstracted SID assigned to the service. In this situation, the SRH acquired as an output of the SRv6 policy creation device 230 is encoded with the abstracted SID and an SID that belongs to the NW device 30 and is held by the NW information acquisition device 210. In the present embodiment, the abstracted SIDs are assigned in units of services; however, it is possible to arbitrarily determine what range is used as the assignment range of the abstracted SIDs.

Further, an example of the resource information table 322 is shown in FIG. 21. As shown in FIG. 21, each of the pieces of resource information stored in the resource information table 322 includes a DC identifier that is an identifier of a hub 40, the service name of a service provided at the hub 40, and an excess resource amount for providing the service. In other words, the resource information denotes an excess resource amount corresponding to each set made up of a hub 40 and a service. As a result of the SRv6 policy creation device 230 creating the SRv6 policy on the basis of these pieces of information, it is possible to avoid communication delays, packet losses, and the like that may be caused by insufficient resources on the SF instance side.

Further, an example of the service request information table 324 is shown in FIG. 22. As shown in FIG. 22, each of the pieces of service request information stored in the service request information table 324 has stored therein a request (e.g., a tolerance delay period of the service) made by an end user (or the service provider).

<<A Functional Configuration of the SRv6 Policy Creation Device 230>>

Figure 23:
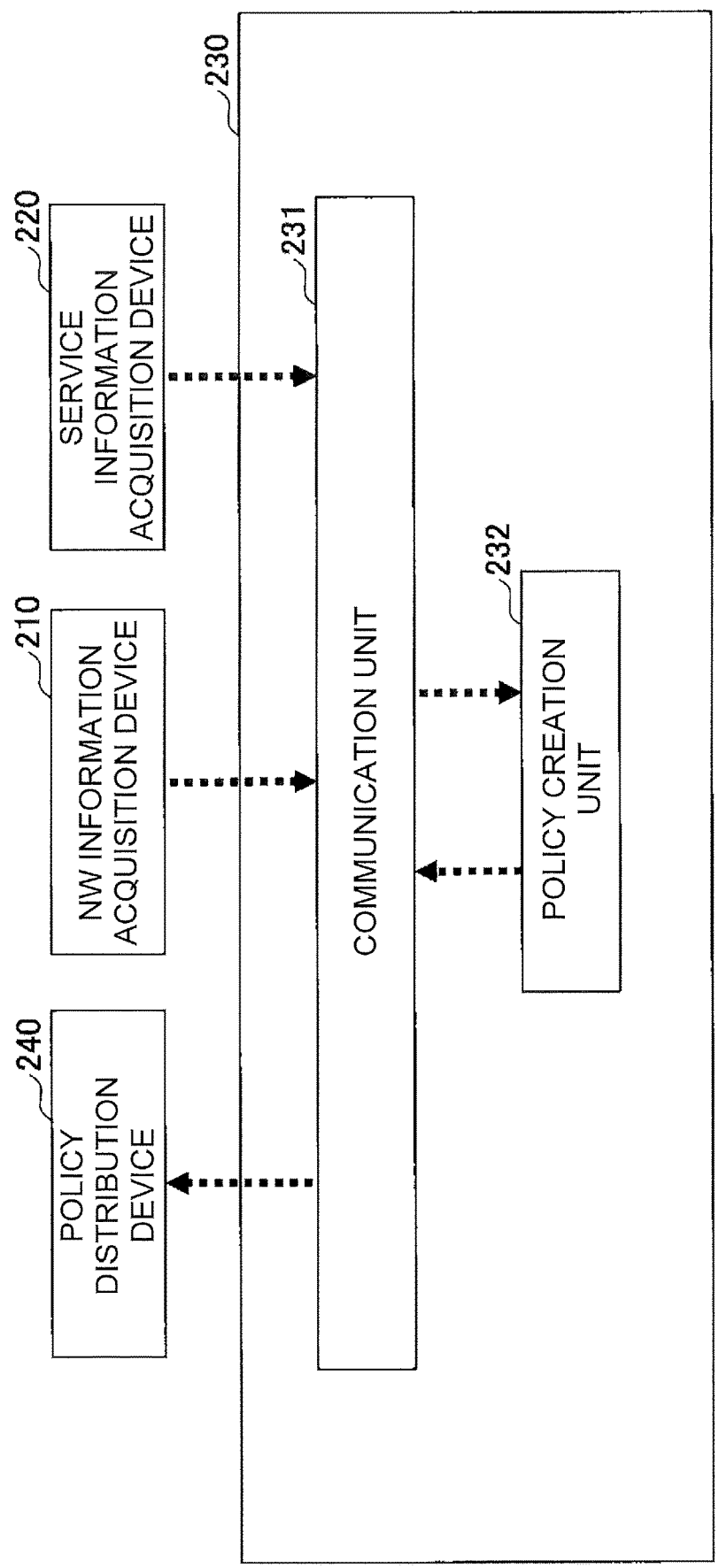
FIG. 23 is a diagram for explaining an example of a functional configuration of an SRv6 policy creation device.

A functional configuration of the SRv6 policy creation device 230 according to the present embodiment will be explained, with reference to FIG. 23. FIG. 23 is a diagram for explaining an example of the functional configuration of the SRv6 policy creation device 230.

As shown in FIG. 23, the SRv6 policy creation device 230 according to the present embodiment includes, as functional units thereof, a communication unit 231 and a policy creation unit 232. These units are realized by processes executed by a processor or the like, for example.

The communication unit 231 receives information from the NW information acquisition device 210 and the service information acquisition device 220 at prescribed intervals. Further, the communication unit 231 transmits the SRv6 policy created by the policy creation unit 232 to the policy distribution device 240.

The policy creation unit 232 creates the SRv6 policy on the basis of the information received from the NW information acquisition device 210 and the service information acquisition device 220. To the SRv6 policy, at least one SRv6 candidate path is assigned. The path is encoded with an abstracted SID and an SID corresponding to the NW device 30. Further, in the SRv6 policy, it is also possible to designate a process to be performed when a NW device 30 receives a packet.

<<A Functional Configuration of the Policy Distribution Device 240>>

Figure 24:
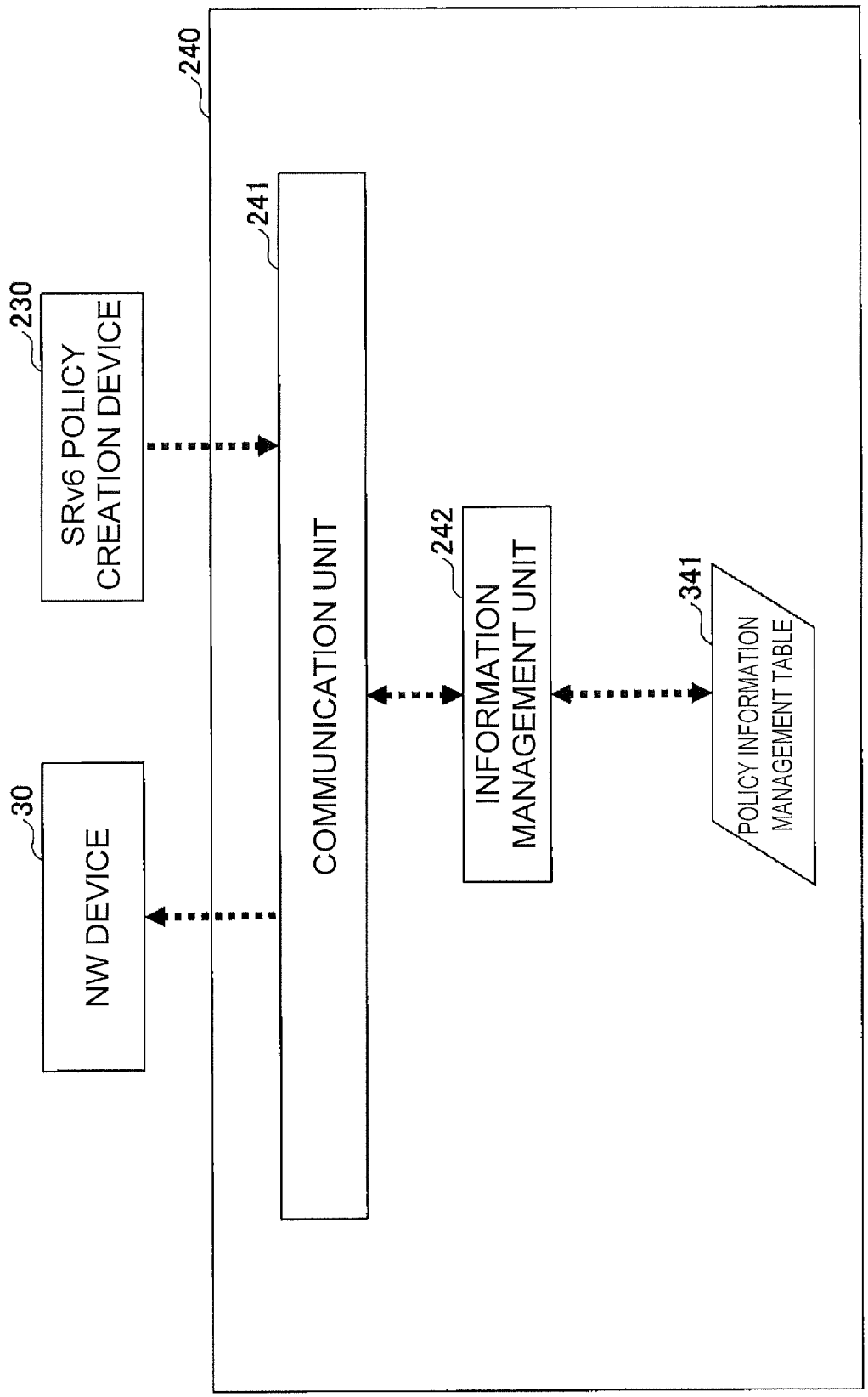
FIG. 24 is a diagram for explaining an example of a functional configuration of a policy distribution device.

A functional configuration of the policy distribution device 240 according to the present embodiment will be explained, with reference to FIG. 24. FIG. 24 is a diagram for explaining an example of the functional configuration of the policy distribution device 240.

As shown in FIG. 24, the policy distribution device 240 according to the present embodiment includes, as functional units thereof, a communication unit 241 and an information management unit 242. These units are realized by processes executed by a processor or the like, for example.

Further, the policy distribution device 240 according to the present embodiment has a policy information management table 341. The table is stored in a storage device or the like.

The communication unit 241 receives the SRv6 policy from the SRv6 policy creation device 230. Further, the communication unit 241 distributes (transmits) the SRv6 policy to the NW device 30. In this situation, the communication unit 241 transmits the SRv6 policy by using a protocol such as PCEP.

The information management unit 242 stores information (policy information) about the SRv6 policy received from the SRv6 policy creation device 230 into the policy information management table 341.

An example of the policy information management table 341 is shown in FIG. 25. As shown in FIG. 25, each of the pieces of policy information includes a policy name, a distribution destination, an applicable condition, a function, and an SID-list. In this situation, the distribution destination is represented by identifier of the NW device 30 serving as a distribution destination of the SRv6 policy. Further, the SID-list denotes information about an SRv6 path. The applicable condition denotes an applicable condition of the SRv6 policy. The function denotes information indicating what type of function is to be implemented.

<<A Functional Configuration of the Routing Header Conversion Device 50>>

Figure 26:
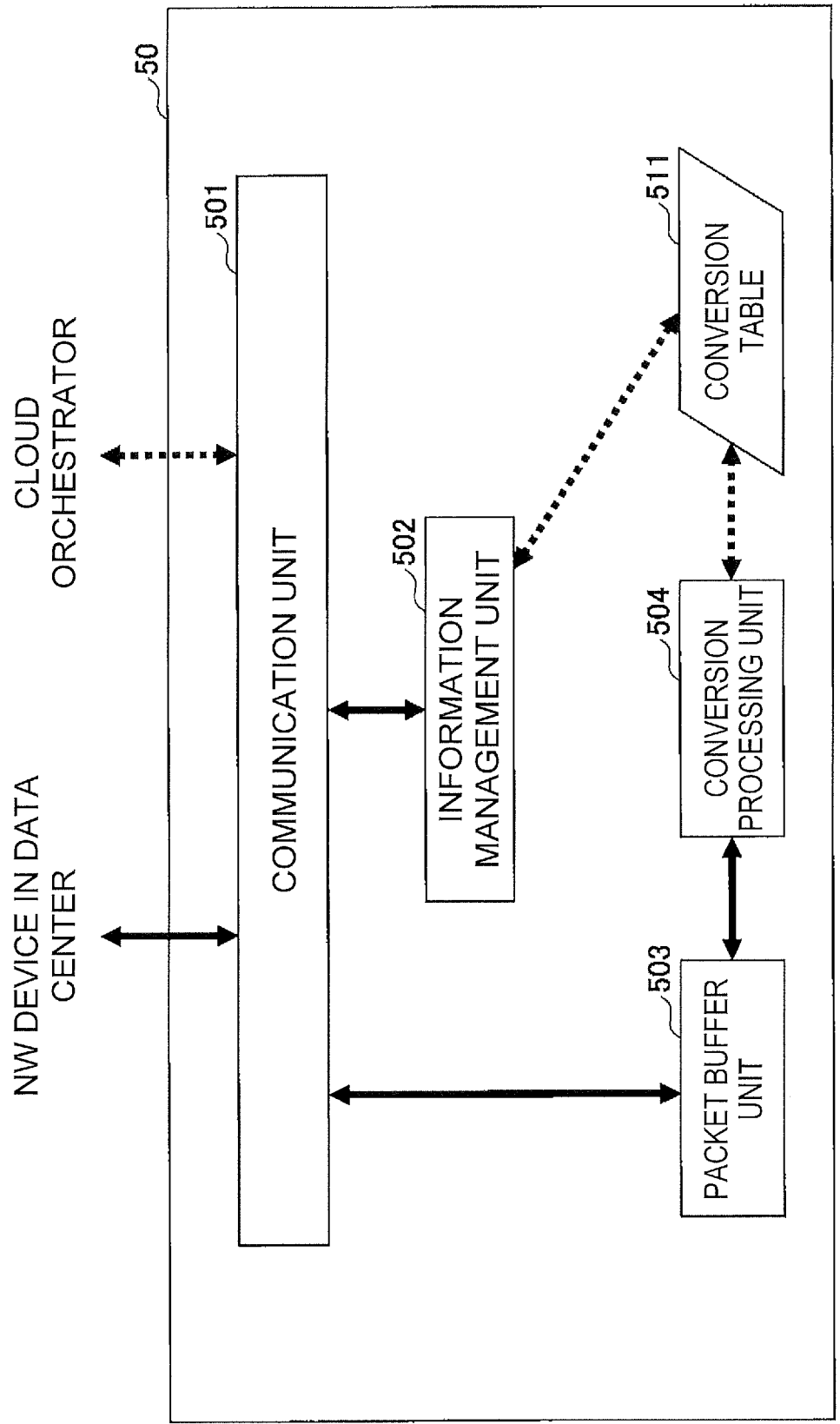
FIG. 26 is a diagram for explaining an example of a functional configuration of a routing header conversion device.

A functional configuration of the routing header conversion device 50 according to the present embodiment will be explained, with reference to FIG. 26. FIG. 26 is a diagram for explaining an example of the functional configuration of the routing header conversion device 50.

As illustrated in FIG. 26, the routing header conversion device 50 according to the present embodiment includes, as functional units thereof, a communication unit 501, an information management unit 502, a packet buffer unit 503, and a conversion processing unit 504. These units are realized by processes executed by a processor or the like, for example.

Further, the routing header conversion device 50 according to the present embodiment has a conversion table 511. The table is stored in a storage device or the like.

The communication unit 501 transmits and receives packets to and from any of the NW devices (e.g., a router) in the hub 40 (the data center). Further, the communication unit 501 transmits and receives various types of information to and from the cloud orchestrator 70.

The information management unit 502 stores information (e.g., information indicating a correspondence relationship among an SA, a DA, and a post-conversion DA) received from the cloud orchestrator 70 into the conversion table 511.

The packet buffer unit 503 buffers the packet received from the NW device in the hub 40. By referring to the conversion table 511, the conversion processing unit 504 converts a parameter (e.g., a DA) in the header of the packet. An example of the conversion table 511 is shown in FIG. 9.

<A Sequence used at the Time of Dispensing the Abstracted SIDs and Sharing Information between the Providers>

Figure 27:
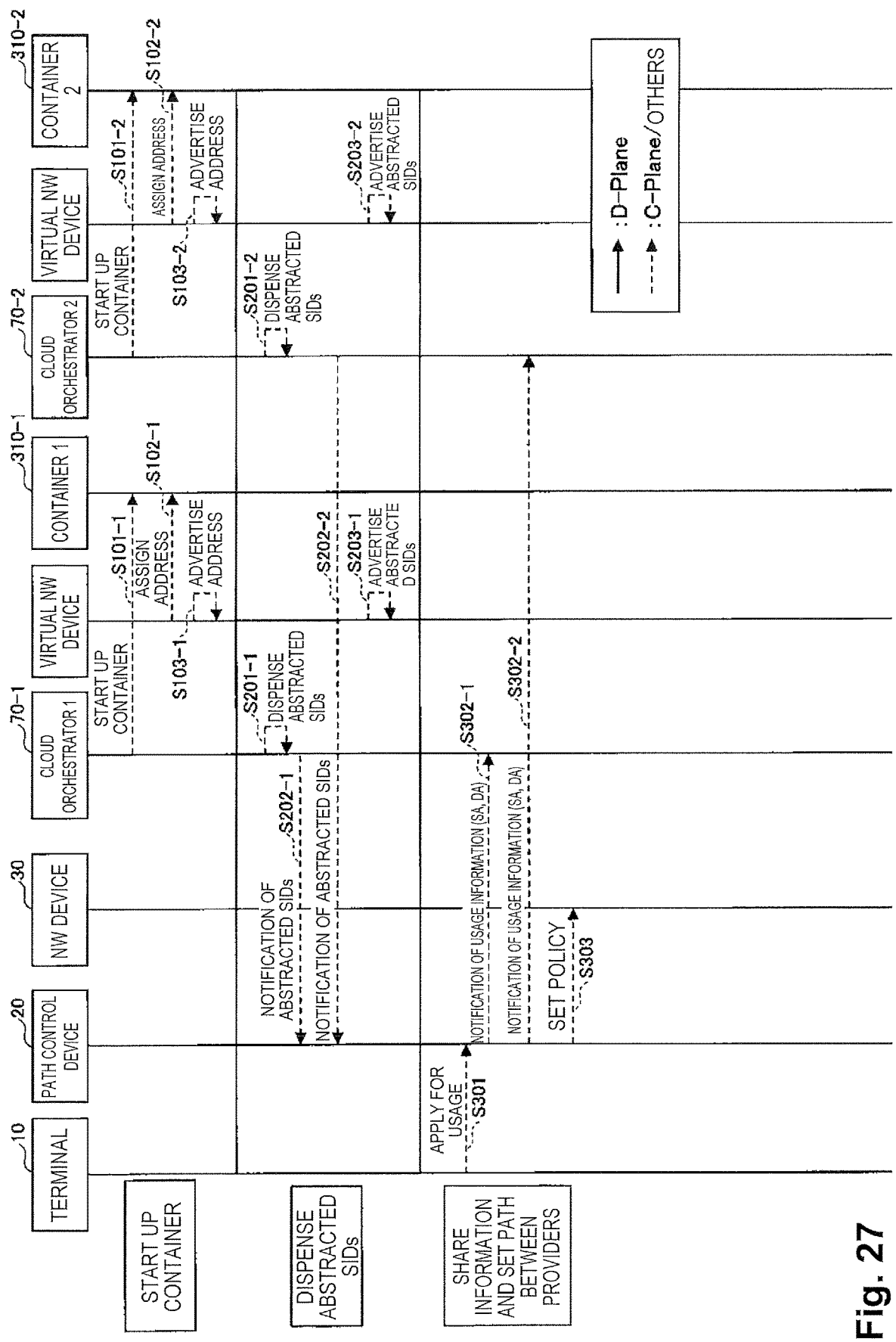
FIG. 27 is a sequence chart for explaining an example of a situation where abstracted SIDs are dispensed and information is shared between providers.

In the following sections, a sequence used in the communication system 1 according to the present embodiment at the time of dispensing the abstracted SIDs and sharing information between the carrier provider and the service provider will be explained, with reference to FIG. 27. FIG. 27 is a sequence chart for explaining an example of the situation where the abstracted SIDs are dispensed and the information is shared between the providers. In the present embodiment, "cluster NW 1" and "cluster NW 2" serve as cluster NWs. The cloud orchestrator 70 of cluster NW 1 will be referred to as a "cloud orchestrator 70-1", whereas the cloud orchestrator 70 of cluster NW 2 will be referred to as a "cloud orchestrator 70-2". Further, the container 310 belonging to cluster NW 1 will be referred to as a "container 310-1", whereas the container 310 belonging to cluster NW 2 will be referred to as a "container 310-2".

Processes from S101-1 through S103-2 denote a sequence at the time of starting up a container (an SF instance). Processes from S201-1 through S203-2 denote a sequence at the time of dispensing the abstracted SIDs. Processes from S301 through S303 denote a sequence for sharing the information and setting a path between the carrier provider and the service provider. In FIG. 27 to FIG. 30 described below, the solid-line arrows express D-pane, whereas the broken-line arrows express C-Plane (or other communication).

The cloud orchestrator 70-1 starts up the container 310-1 belonging to cluster NW 1 (S101-1). Similarly, the cloud orchestrator 70-2 starts up the container 310-2 belonging to cluster NW 2 (S101-2).

A virtual NW device in cluster NW 1 (i.e., a function of the physical host 60 that performs routing in cluster NW 1) assigns an address (or an SID) to the container 310-1 (S102-1). Similarly, a virtual NW device in a cluster NW 2 assigns an address (or an SID) to the container 310-2 (S102-2).

Further, the virtual NW device in cluster NW 1 and the virtual NW device in cluster NW 2 each advertise the addresses (or the SIDs) of the containers 310 to the inside of the hub 40 (steps S103-1 and S103-2). As explained above, the range of the advertisement varies among routing methods 1 to 3.

Subsequently, the cloud orchestrator 70-1 and the cloud orchestrator 70-2 each dispense the abstracted SIDs in an assignment range determined in advance (S201-1 and S201-2). After that, the cloud orchestrator 70-1 and the cloud orchestrator 70-2 each notify the path control device 20 of the dispensed abstracted SIDs (S202-1 and S202-2).

Further, the virtual NW device in cluster NW 1 and the virtual NW device in cluster NW 2 each advertise the abstracted SIDs (S203-1 and S203-2). As explained above, the range of the advertisement varies among routing methods 1 to 3.

Subsequently, the terminal 10 transmits a usage application for a service to the path control device 20 (S301). As explained above, the usage application includes an SA, a DA, the service name, and the order. Besides these pieces of information, the service request information may also be included, for example.

In the following sections, let us assume that the abovementioned usage application includes, as the service names, the service name of a service provided by the container 310-1 and the service name of a service provided by the container 310-2.

The path control device 20 notifies the cloud orchestrator 70-1 and the cloud orchestrator 70-2 of the usage information (i.e., a pair made up of the SA and the DA) (S302-1 and S302-2). Further, into the NW device 30, the path control device 20 sets an SRv6 policy that realizes path control for providing the services related to the abovementioned usage application (S303).

<A Sequence used at the Time of a Packet Forwarding and a Routing Header Conversion>

Next, a sequence at the time of a packet forwarding and a routing header conversion will be explained. As explained above, possible routing methods include routing methods 1-*a* to 3. In the following sections, a sequence at the time of the packet forwarding and the routing header conversion in each of the situations where routing methods 1-*b*, 2, and 3 are used will be explained. The following will describe an example in which the terminal 10 performs E2E communication with a server, by sequentially using the service (SF 1)

provided by the container 310-1 and the service (SF 2) provided by the container 310-2.

<<Routing Method 1-*b*>>

Figure 28:
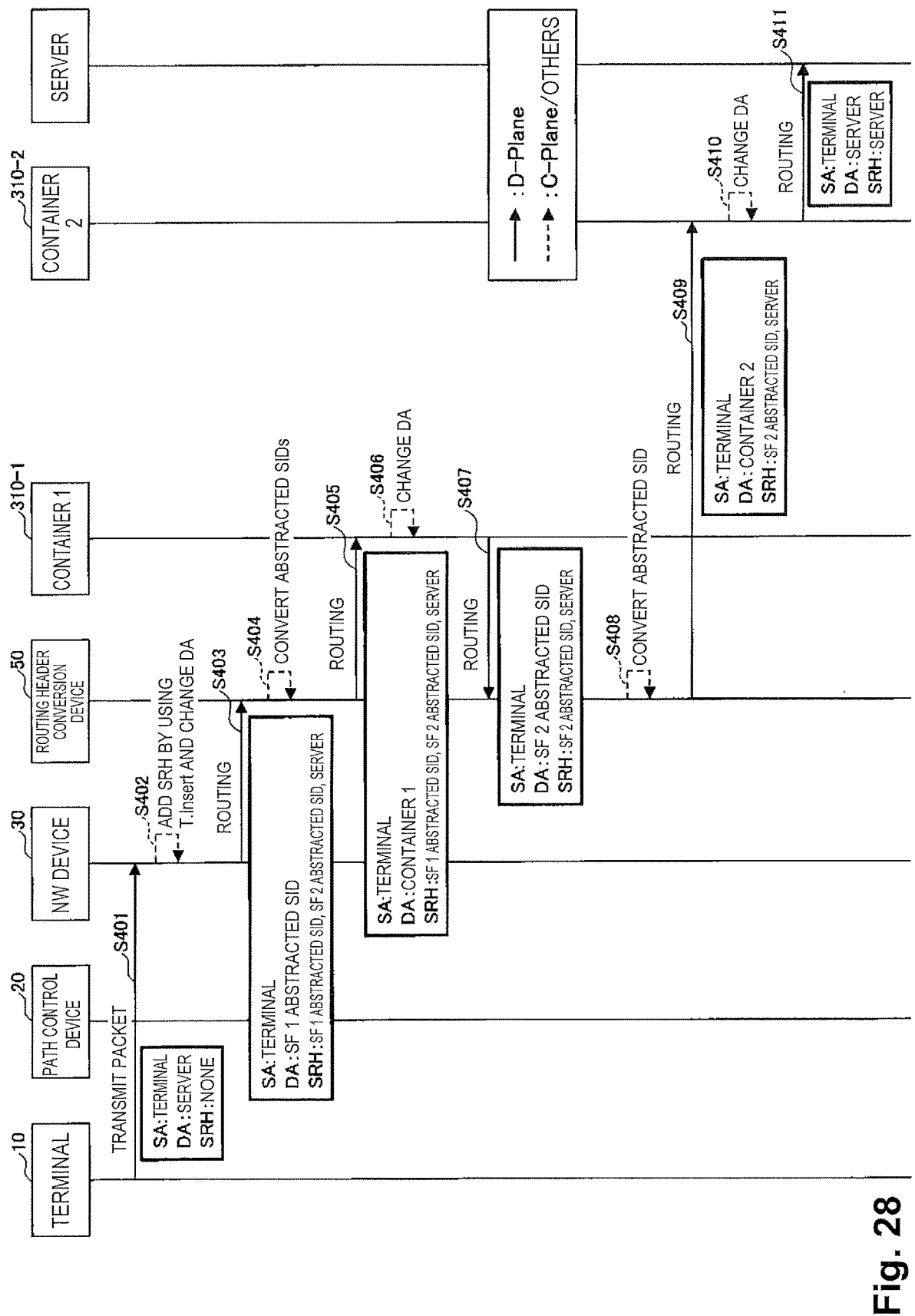
FIG. 28 is a sequence chart for explaining examples of a packet forwarding and a routing header conversion according to routing method 1-b.

In the following sections, a sequence used at the time of the packet forwarding and the routing header conversion while routing method 1-*b* is used will be explained, with reference to FIG. 28. FIG. 28 is a sequence chart for explaining examples of the packet forwarding and the routing header conversion according to routing method 1-*b*. As a characteristic of this method, a single routing header conversion device 50 contains a plurality of services (cluster NWs).

The terminal 10 transmits a packet to the NW device 30 (e.g., an edge router in the management NW) (S401). Let us assume that the header of the packet is set with an SA "the address (or the SID) of the terminal 10" and a DA "the address (or the SID) of the server". At this point in time, no SRH is present.

The NW device 30 implements T.Insert, adds an SRH to the packet, and changes the DA (S402). As a result, the SA is "the address (or the SID) of the terminal 10"; the DA is "the abstracted SID of SF 1"; and the SRH is "the abstracted SID of SF 1, the abstracted SID of SF 2, the address (or the SID) of the server". As explained above, according to the present embodiment, the abstracted SIDs are assigned in units of services, i.e., in units of cluster NWs each structured with the SF instances providing the service.

Further, the NW device 30 transmits the packet (follows the routing) according to the DA (or the SID encoded in the SRH) (S403). As a result, the packet is routed to the routing header conversion device 50 at the hub 40.

By using conversion method 1 or conversion method 2, the routing header conversion device 50 converts the abstracted SIDs into the SIDs (or the addresses) of the containers 310 (S404). When conversion method 1 is used, the DA is "the SID (or the address) of the container 310-1"; and the SRH is "the abstracted SID of SF 1, the abstracted SID of SF 2, the address (or the SID) of the server".

Further, the routing header conversion device 50 transmits the packet (follows the routing) according to the DA (S405). As a result, the packet is routed up to the container 310-1.

Upon receipt of the packet, the container 310-1 performs a process of the SF and changes the DA into the abstracted SID of SF 2 (S406). In this situation, the container 310-1 is able to change the DA into the abstracted SID of the SF 2 by implementing End.

As a result, the packet is routed to the routing header conversion device 50 (S407).

By using conversion method 1 or conversion method 2, the routing header conversion device 50 converts the abstracted SID into the SID (or the address) of the container 310 (S408). When conversion method 1 is used, the DA is "the SID (or the address) of the container 310-2"; and the SRH is "the abstracted SID of SF 2, the address (or the SID) of the server".

As a result, the packet is routed to the container 310-2 (S409).

After that, similarly, upon receipt of the packet, the container 310-2 performs a process of the SF and changes the DA into the address (or the SID) of the server (S410). As a result, the packet is routed up to the server (S411).

<<Routing Method 2>>

Figure 29:
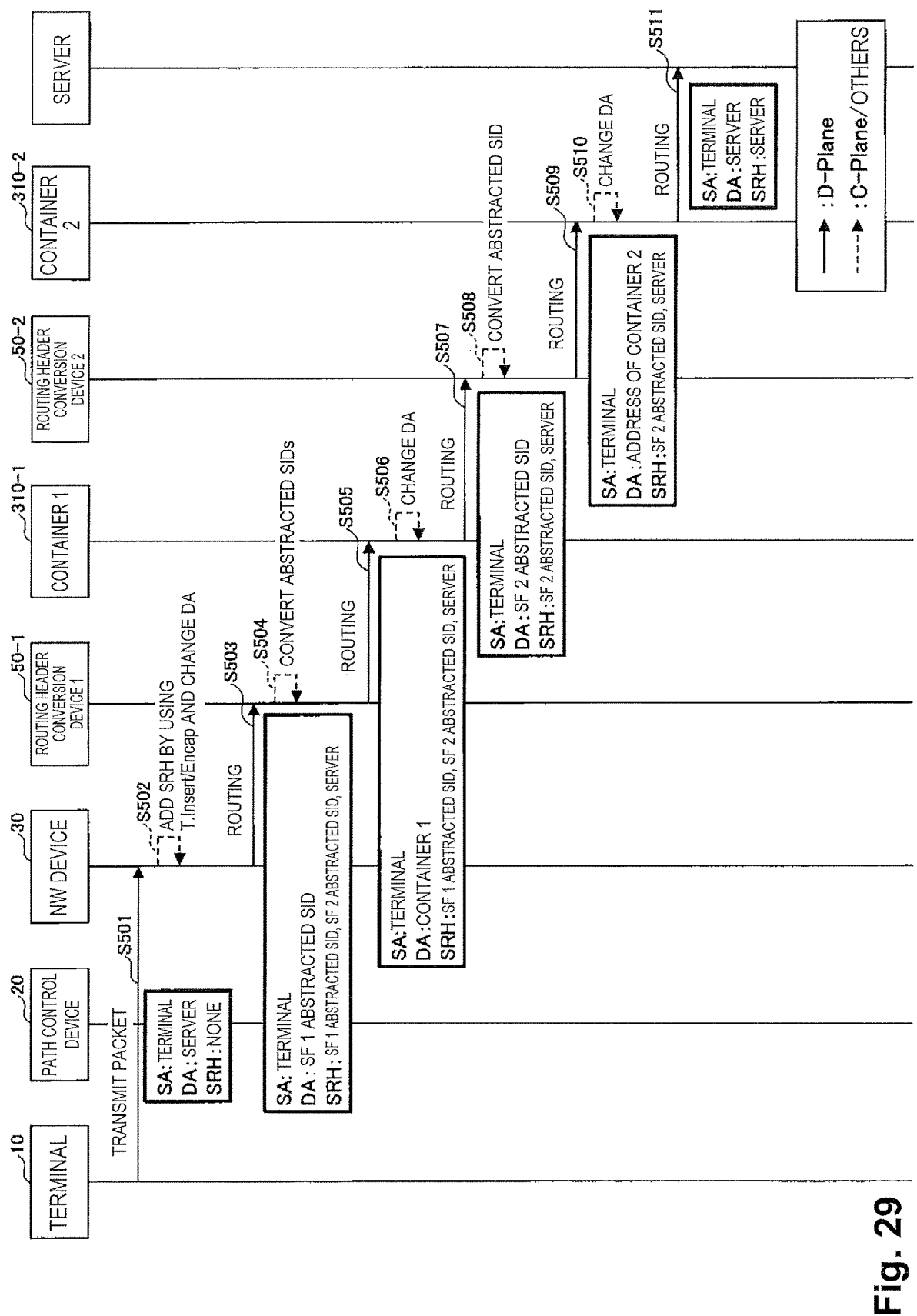
FIG. 29 is a sequence chart for explaining examples of a packet forwarding and a routing header conversion according to routing method 2.

In the following sections, a sequence used at the time of the packet forwarding and the routing header conversion while routing method 2 is used will be explained, with reference to FIG. 29. FIG. 29 is a sequence chart for explaining examples of the packet forwarding and the routing header conversion according to routing method 2. As a characteristic of this method, each of the routing header conversion devices 50 provided in units of services (cluster NWs) converts abstracted SIDs dispensed by a single service (a cluster NW) into identifiers (addresses/SIDs) of the SF instances.

According to routing method 2, a pod for a GW is provided for each cluster NW, so that the pods for the GWs structure a hub GW cluster. For this reason, in FIG. 29, the pod for the GW of cluster NW 1 is referred to as a "routing header conversion device 50-1", whereas the pod for the GW of cluster NW 2 is referred to as a "routing header conversion device 50-2".

The terminal 10 transmits a packet to the NW device 30 (e.g., an edge router in the management NW) (S501). Let us assume that the header of the packet is set with an SA "the address (or the SID) of the terminal 10" and a DA "the address (or the SID) of the server". At this point in time, no SRH is present.

The NW device 30 implements T.Insert or End.B6.Encaps, adds an SRH to the packet, and changes the DA (S502). As a result, the SA is "the address (or the SID) of the terminal 10"; the DA is "the abstracted SID of SF 1"; and the SRH is "the abstracted SID of SF 1, the abstracted SID of SF 2, the server". As explained above, according to the present embodiment, the abstracted SIDs are assigned in units of services (i.e., in units of cluster NWs each structured with the SF instances providing the service).

Further, according to the DA (or the SID encoded in the SRH), the NW device 30 transmits the packet (follows the routing) (S503). As a result, the packet is routed to the routing header conversion device 50-1 at the hub 40.

By using conversion method 1 or conversion method 2, the routing header conversion device 50-1 converts the abstracted SIDs into the SIDs (or the addresses) of the containers 310 (S504). When conversion method 1 is used, the DA is "the SID (or the address) of the container 310-1"; and the SRH is "the abstracted SID of SF 1, the abstracted SID of SF 2, the address (or the SID) of the server".

Further, according to the DA, the routing header conversion device 50-1 transmits the packet (follows the routing) (S505). As a result, the packet is routed up to the container 310-1.

Upon receipt of the packet, the container 310-1 performs a process of the SF and changes the DA to the abstracted SID of SF 2 (S506). In this situation, the container 310-1 is able to change the DA into the abstracted SID of SF 2, by implementing End.

As a result, the packet is routed to the routing header conversion device 50-2 (S507).

After that, similarly, the routing header conversion device 50-2 converts the abstracted SID into the SID (or the address) of the container 310-2 by using conversion method 1 or conversion method 2 (S508). When conversion method 1 is used, the DA is "the SID (or the address) of the container 310-2"; and the SRH is "the abstracted SID of SF 2, the address (or the SID) of the server".

Further, according to the DA, the routing header conversion device 50-2 transmits the packet (follows the routing) (S509). As a result, the packet is routed up to the container 310-2.

Upon receipt of the packet, the container 310-2 performs a process of the SF and changes the DA to the address (or the SID) of the server (S510). As a result, the packet is routed to the server (S511).

<<Routing Method 3>>

Figure 30:
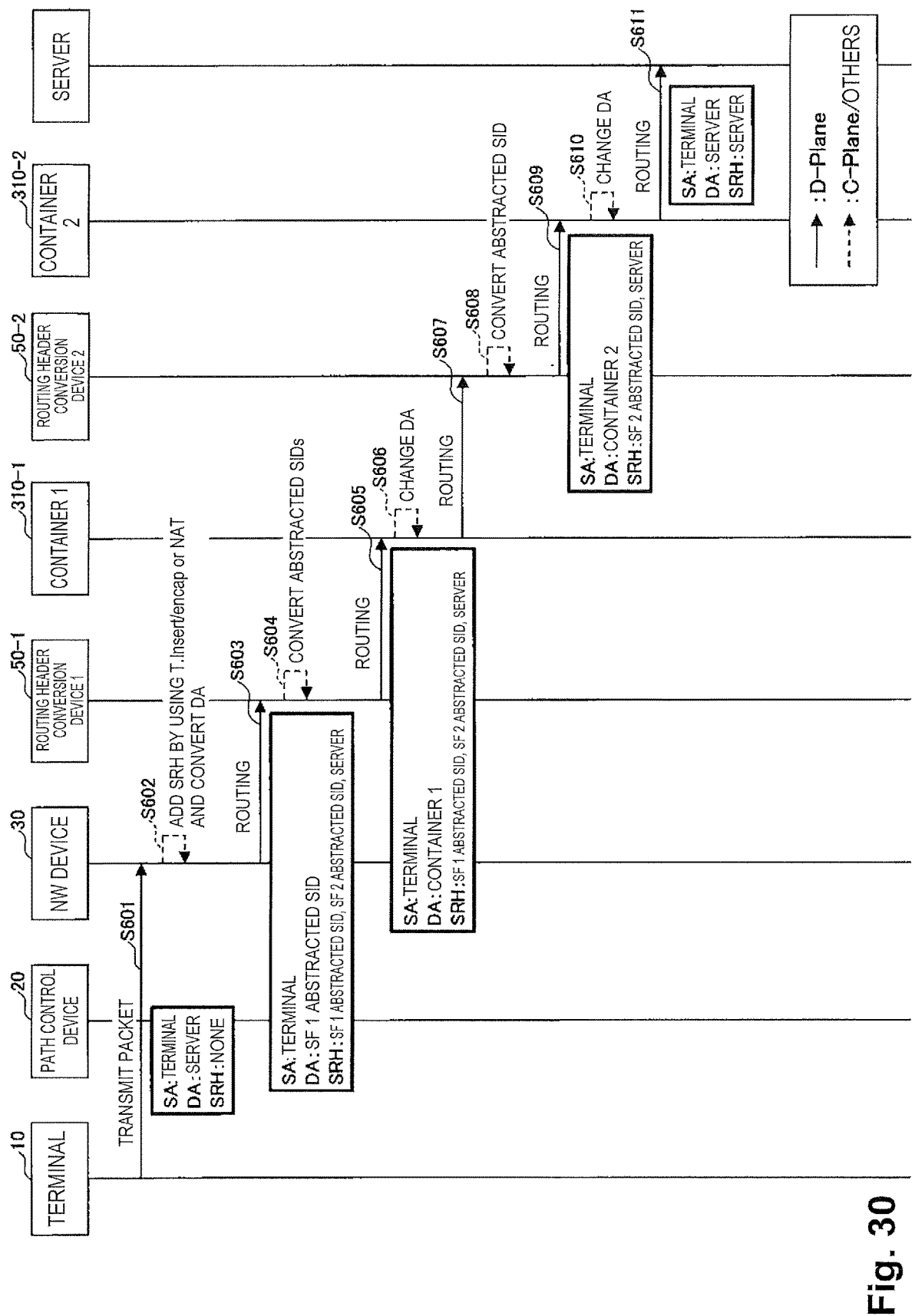
FIG. 30 is a sequence chart for explaining examples of a packet forwarding and a routing header conversion according to routing method 3.

In the following sections, a sequence used at the time of the packet forwarding and the routing header conversion while routing method 3 is used will be explained, with reference to FIG. 30. FIG. 30 is a sequence chart for explaining examples of the packet forwarding and the routing header conversion according to routing method 3. As a characteristic of this method, the routing header conversion device 50 provided for each service (a cluster NW) converts abstracted SIDs dispensed by the service provider into identifiers (addresses/SIDs) of the SF instances.

According to routing method 3, a hub GW pod is provided for each cluster NW. For this reason, in FIG. 30, the hub GW pod of cluster NW 1 is referred to as a "routing header conversion device 50-1", whereas the hub GW pod of cluster NW 2 is referred to as a "routing header conversion device 50-2".

The terminal 10 transmits a packet to the NW device 30 (e.g., an edge router in the management NW) (S601). Let us assume that the header of the packet is set with an SA "the address (or the SID) of the terminal 10" and a DA "the address (or the SID) of the server". At this point in time, no SRH is present.

The NW device 30 implements T.Insert or End.B6.Encaps, adds an SRH to the packet, and changes the DA (S602). As a result, the SA is "the address (or the SID) of the terminal 10"; the DA is "the abstracted SID of SF 1"; and the SRH is "the abstracted SID of SF 1, the abstracted SID of SF 2, the server". As explained above, according to the present embodiment, the abstracted SIDs are assigned in units of services (i.e., in units of cluster NWs each structured with the SF instances providing the service).

Further, according to the DA (or the SID encoded in the SRH), the NW device 30 transmits the packet (follows the routing) (S603). As a result, the packet is routed to the routing header conversion device 50-1 at the hub 40.

By using conversion method 1 or conversion method 2, the routing header conversion device 50-1 converts the abstracted SIDs into the SIDs (or the addresses) of the containers 310 (S604). When conversion method 1 is used, the DA is "the SID (or the address) of the container 310-1"; and the SRH is "the abstracted SID of SF 1, the abstracted SID of SF 2, the address (or the SID) of the server".

Further, according to the DA, the routing header conversion device 50-1 transmits the packet (follows the routing) (S605). As a result, the packet is routed up to the container 310-1.

Upon receipt of the packet, the container 310-1 performs a process of the SF and changes the DA into the abstracted SID of SF 2 (S606). In this situation, the container 310-1 is able to change the DA into the abstracted SID of SF 2 by implementing End.

As a result, the packet is routed to the routing header conversion device 50-2 (S607).

After that, similarly, the routing header conversion device 50-2 converts the abstracted SID into the SID (or the address) of the container 310-2 by using conversion method 1 or conversion method 2 (S608). When conversion method 1 is used, the DA is "the SID (or the address) of the container 310-2"; and the SRH is "the abstracted SID of SF 2, the address (or the SID) of the server".

Further, according to the DA, the routing header conversion device 50-2 transmits the packet (follows the routing) (S609). As a result, the packet is routed up to the container 310-2.

Upon receipt of the packet, the container 310-2 performs a process of the SF and changes the DA into the address (or the SID) of the server (S610). As a result, the packet is routed to the server (S611).

<A Hardware Configuration>

Figure 31:
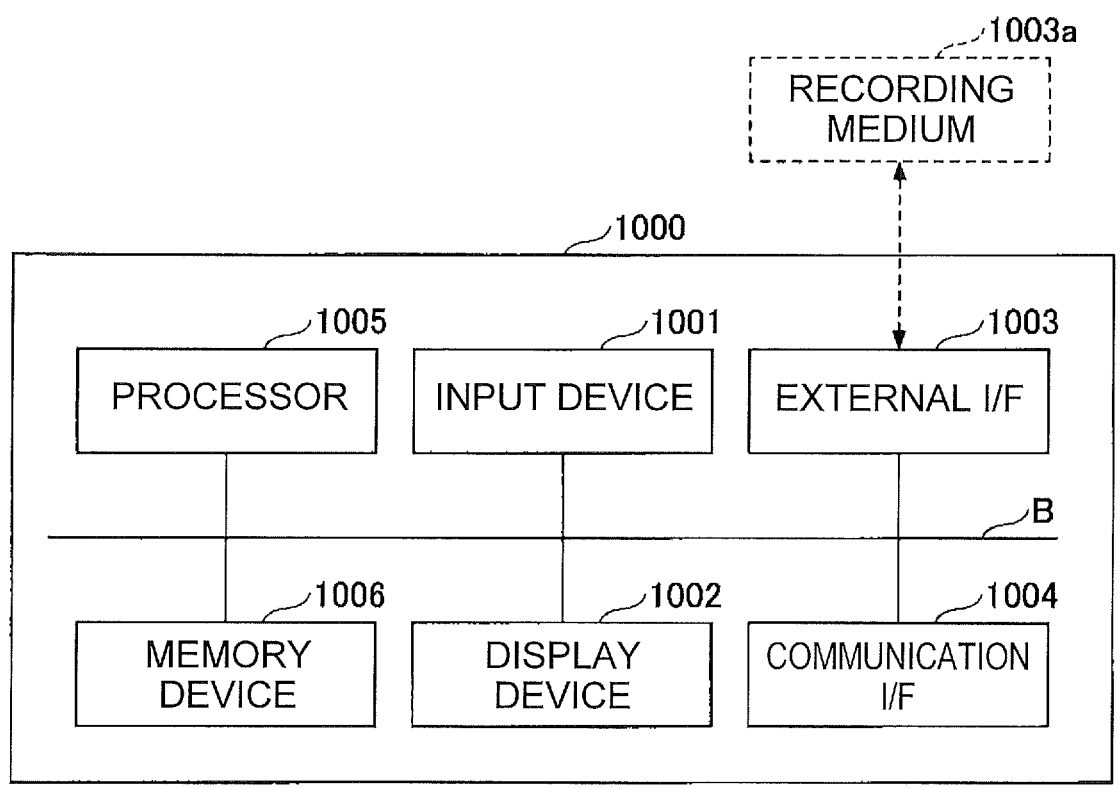
FIG. 31 is a diagram for explaining an example of a hardware configuration of a computer.

Lastly, a hardware configuration of a computer 1000 that realizes various types of machines and devices (e.g., the terminals 10, the path control device 20, the routing header conversion device 50, and the physical hosts 60) included in the communication system 1 according to the present embodiment will be explained. FIG. 31 is a diagram for explaining an example of the hardware configuration of the computer 1000. It is possible to realize the various types of machines and devices included in the communication system 1 according to the present embodiment, by using at least one computer 1000 shown in FIG. 31, for example.

The computer 1000 shown in FIG. 31 includes, as hardware, an input device 1001, a display device 1002, an external I/F 1003, a communication I/F 1004, a processor 1005, and a memory device 1006. These pieces of hardware are communicably connected to one another via a bus B.

The input device 1001 is, for example, a keyboard, a mouse, a touch panel, and/or the like. The display device 1002 is a display monitor or the like, for example. At least one of the input device 1001 and the display device 1002 may be omitted from the computer 1000.

The external I/F 1003 is an interface for external devices. Examples of the external devices include a recording medium 1003a realized with any of various types of external recording media.

The communication I/F 1004 is an interface used for connecting the computer 1000 to a communication network. The processor 1005 is, for example, a computation device such as a Central Processing Unit (CPU). The memory device 1006 is a storage device such as a Random Access Memory (RAM) or an auxiliary storage device.

Further, the computer 1000 may include, as hardware, two or more of the processors 1005 and/or two or more of the memory devices 1006.

The present invention is not limited to the above embodiments specifically disclosed herein. It is possible to apply various modifications and changes thereto without departing from the scope of the claims.

REFERENCE SIGNS LIST

1 Communication System
2 Terminal
20 Path Control Device
30 NW Device
40 Hub
50 Routing Header Conversion Device
60 Physical Host
70 Cloud Orchestrator
210 NW Information Acquisition Device
220 Service information Acquisition Device
230 SRv6 Policy Creation Device
240 Policy Distribution Device

The invention claimed is:

1. A communication system that realizes End-to-End communication between communication devices via at least one service function by using Segment Routing IPv6, the communication system comprising:
 a processor; and
 a memory that includes instructions, which when executed, cause the processor to execute:

transferring a packet received from one of the communication devices at a communication origin of the End-to-End communication, by using an abstracted ID obtained by abstracting a segment ID in a prescribed range determined in advance; and converting, upon receipt of the packet including the abstracted ID, the abstracted ID into an address or a segment ID of a service function instance providing the service function, wherein the converting is executed for each cluster network to which the service function instance belongs.

2. The communication system according to claim 1, wherein the converting includes one of following:

converting the abstracted ID into the address or the segment ID of the service function instance, by using a conversion table keeping, in correspondence with one another, a transmission origin address of the communication device at the communication origin, the abstracted ID, and the post-conversion segment ID obtained by converting the abstracted ID while using a network address conversion function; and converting the abstracted ID into the address or the segment ID of the service function instance, by performing an End.B6.Encaps process on the packet on a basis of a Segment Routing IPv6 policy set in advance.

3. The communication system according to claim 1, wherein the abstracted ID is assigned in one of following manners:

assigned for each set of service function instances providing a mutually same service;

assigned for each set of service function instances belonging to a mutually same cluster network; and assigned for each set of service function instances provided in physical hosts installed in a mutually same hub.

4. The communication system according to claim 1, wherein the processor is further caused to execute:

transmitting the packet to the service function instance by using the address or the segment ID resulting from the conversion at the converting.

5. The communication system according to claim 1, wherein the converting is executed for each hub having installed therein one or more physical hosts realizing the service function instance.

6. The communication system according to claim 1, wherein the converting is executed for each cluster network as one of following:

a pod belonging to a same autonomous system as that of the service function instance; and a pod belonging to a different autonomous system from that of the service function instance.

7. A communication method implemented in a communication system that realizes End-to-End communication between communication devices via at least one service function by using Segment Routing IPv6, the communication method comprising:

transferring a packet received from one of the communication devices at a communication origin of the End-to-End communication, by using an abstracted ID obtained by abstracting a segment ID in a prescribed range determined in advance; and converting, upon receipt of the packet including the abstracted ID, the abstracted ID into an address or a segment ID of a service function instance providing the service function, wherein the converting is executed for each cluster network to which the service function instance belongs.

* * * * *